(12) United States Patent
Inaba et al.

(10) Patent No.: US 7,943,695 B2
(45) Date of Patent: May 17, 2011

(54) MAGNETIC POLYMER PARTICLE, METHOD OF PRODUCING THE SAME, AND AQUEOUS DISPERSION, CARTRIDGE, AND IMAGE FORMING APPARATUS USING THE SAME

(75) Inventors: Yoshihiro Inaba, Kanagawa (JP); Takako Kobayashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 673 days.

(21) Appl. No.: 11/968,875

(22) Filed: Jan. 3, 2008

(65) Prior Publication Data
US 2008/0167420 A1 Jul. 10, 2008

(30) Foreign Application Priority Data

Jan. 9, 2007 (JP) .................................. 2007-001616

(51) Int. Cl.
*C08L 31/00* (2006.01)
*A61K 9/16* (2006.01)

(52) U.S. Cl. ...................................... 524/556; 524/543
(58) Field of Classification Search .................. 524/556, 524/543

See application file for complete search history.

(56) References Cited

U.S. PATENT DOCUMENTS 4,552,472 A * 11/1985 Tsuge et al. ................ 400/124.1
2007/0123639 A1 * 5/2007 Inaba et al. .................... 524/556

FOREIGN PATENT DOCUMENTS

| JP | 57-102666 | 6/1982 |
| JP | 59-221302 | 12/1984 |
| JP | 4-3088 | 1/1992 |
| JP | 4-34578 | 6/1992 |
| JP | 5-10808 | 2/1993 |
| JP | 7-225491 | 8/1995 |
| JP | 8-44107 | 2/1996 |
| JP | 9-208788 | 8/1997 |
| JP | 10-87711 | 4/1998 |
| JP | 10-270233 | 10/1998 |
| JP | 2004-295110 | 10/2004 |
| JP | 2004-310078 | 11/2004 |
| JP | 2004-331953 | 11/2004 |
| JP | 2005-91705 | 4/2005 |

* cited by examiner

*Primary Examiner* — William K Cheung
(74) *Attorney, Agent, or Firm* — Fildes & Outland, P.C.

(57) ABSTRACT

The present invention provides a magnetic polymer particle, including a magnetic powder; a crosslinked polymer of an ethylenically unsaturated monomer; and a non-crosslinked polymer, in which an amount of the magnetic powder with respect to a total amount of the magnetic polymer particle is in a range of about 2.5 to about 50% by mass, the ethylenically unsaturated monomer includes a monomer having a hydroxyl group and a hydrophobic monomer which is free from a hydroxyl group, and an amount of the hydroxyl groups included in the crosslinked polymer and the non-crosslinked polymer is in a range of about 0.1 to about 5.0 mmol/g with respect to a total amount of the crosslinked polymer and the non-crosslinked polymer. Further, the invention provides a method of producing the magnetic polymer particle, and an aqueous dispersion, a cartridge, and an image forming apparatus, all of which use the magnetic polymer particle.

7 Claims, 2 Drawing Sheets

US 7,943,695 B2

MAGNETIC POLYMER PARTICLE, METHOD OF PRODUCING THE SAME, AND AQUEOUS DISPERSION, CARTRIDGE, AND IMAGE FORMING APPARATUS USING THE SAME

CROSS-REFERENCE TO RELATED APPLICATION

This application claims priority under 35 USC 119 from Japanese Patent Application No. 2007-001616 filed Jan. 9, 2007.

BACKGROUND

1. Technical Field

The present invention relates to a magnetic polymer particle, a method of producing the magnetic polymer particle, and an aqueous dispersion, a cartridge, and an image forming apparatus, all of which use the magnetic polymer particle.

2. Related Art

A magnetic toner for developing electrostatic latent images in electrophotography is known as a magnetic polymer particle.

Further, particles for fixing a physiologically active substance are known as magnetic polymer particles that may be used for an aqueous dispersion.

Still further, particles each having a carboxyl group are known as magnetic polymer particles for fixing a physiologically active substance.

In addition, a method in which a polymer having a hydroxyl group is used as a binder resin for a magnetic paint for preparing magnetic tapes is known.

SUMMARY

The present invention provides a magnetic polymer particle having excellent water dispersibility and that is fixable on paper, film or the like, an aqueous dispersion using the magnetic polymer particle, and a cartridge and an image forming apparatus, which use the aqueous dispersion. Furthermore, the invention provides a method of producing the magnetic polymer particles, which can suppress agglomeration of the particles and according to which preferred particles can be obtained at an excellent yield, even when the magnetic polymer particles are obtained by suspension polymerizing in an aqueous medium.

According to an aspect of the invention, a magnetic polymer particle is provided, including:

a magnetic power;

a crosslinked polymer formed by polymerization of an ethylenically unsaturated monomer; and a non-crosslinked polymer, in which the amount of the magnetic powder with respect to the total amount of the magnetic polymer particle is in a range of about 2.5% by mass to about 50% by mass, the ethylenically unsaturated monomer includes a monomer having a hydroxyl group and a hydrophobic monomer which is free from a hydroxyl group, and the amount of hydroxyl groups included in the crosslinked polymer and the non-crosslinked polymer is in a range of about 0.1 mmol/g to about 5.0 mmol/g with respect to the total amount of the crosslinked polymer and the non-crosslinked polymer.

DETAILED DESCRIPTION

Figure 1:
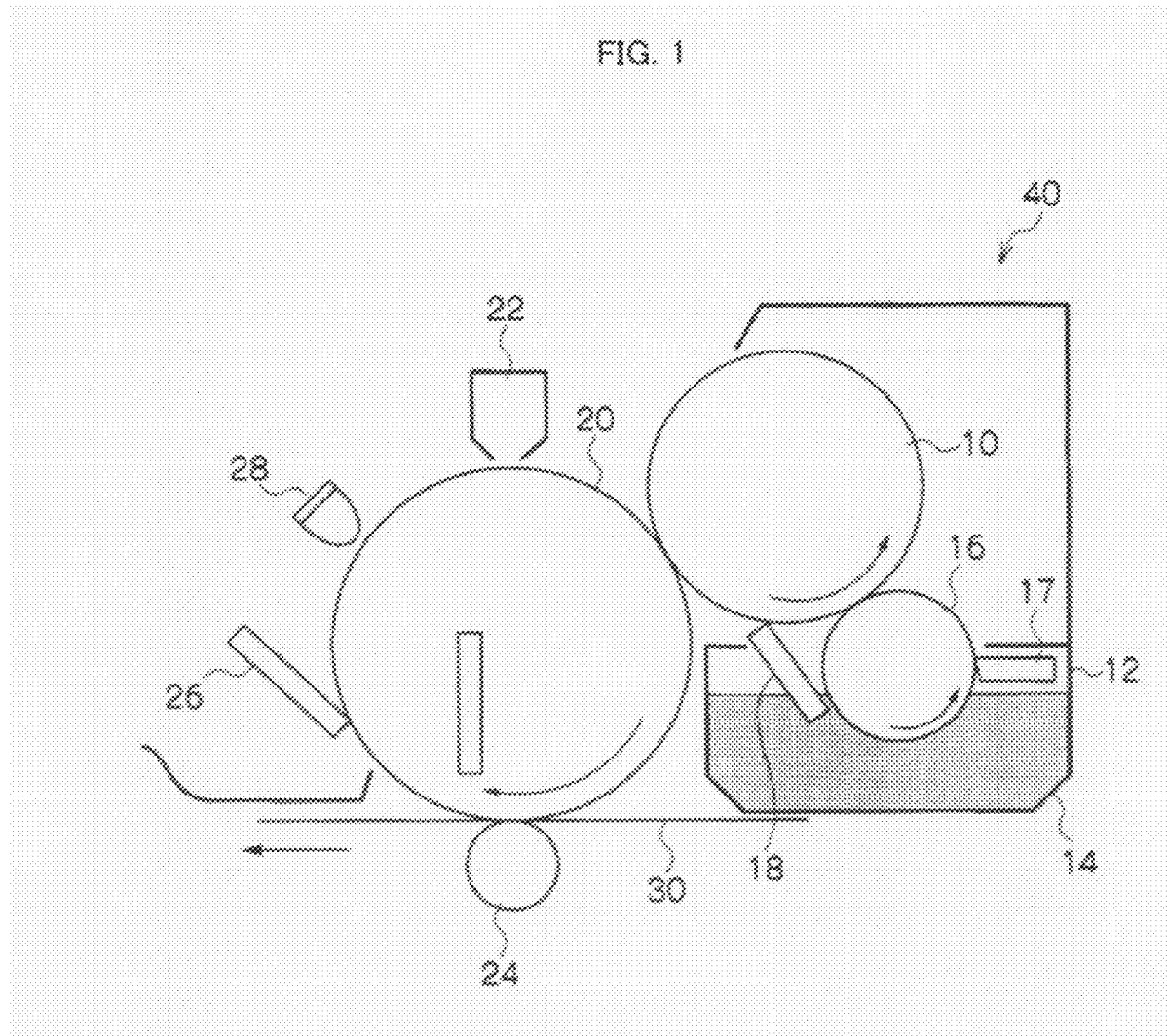
FIG. 1 is a schematic configurational diagram showing one example of an image forming apparatus according to an exemplary embodiment of the present invention.

Hereinafter, exemplary embodiments of the present invention will be described in more detail.

Magnetic Polymer Particle

A magnetic polymer particle according to an exemplary embodiment of the invention is a particulate magnetic polymer mainly used in an aqueous dispersion such as magnetic printing ink. Accordingly, the magnetic polymer particle according to an exemplary embodiment of the invention may be (uniformly) disposed without fluctuation in an aqueous medium such as water, while maintaining a magnetic force at a constant value or above.

The magnetic polymer particle is formed of a magnetic powder-dispersed particle formed by dispersing magnetic powder in a polymer.

In order to obtain excellent dispersibility in the aqueous medium, it is effective to enable a hydroxyl group to exist on a surface of a particle. Therefore, a crosslinked component of a polymer (crosslinked polymer) constituting a particle that is stable in the aqueous medium desirably ahs a hydroxyl group.

On the other hand, when the aqueous dispersion is used as an image-forming recording solution, an image formed of the magnetic polymer particles should be fixed on a recording medium. In the fixing, thermal fixing may be used. However, when almost all of the magnetic polymer particles are formed of a crosslinked component, excellent fixability may not be obtained in some cases.

In the invention, the optimum amount of hydroxyl groups and range of the component ratio of the crosslinked polymer to the non-crosslinked polymer were investigated from the viewpoints of the dispersibility in the aqueous medium and the stability and fixability of the polymer particles, with respect to a case in which a mixture of a crosslinked polymer of an ethylenically unsaturated monomer and a non-crosslinked polymer is used as a polymer and the crosslinked polymer is a crosslinked polymer of an ethylenically unsaturated monomer having a hydroxyl group. Furthermore, in the invention, a specific amount of magnetic powder is included in a polymer particle. Therefore, from the viewpoint of the relationship between the dispersibility and the amount of the magnetic powder in the particle, ranges within which the amount of hydroxyl groups and the component ratio were optimized have been identified.

The polymer in the exemplary embodiment is formed of a crosslinked polymer of an ethylenically unsaturated monomer and a non-crosslinked polymer. In this case, the crosslinked polymer is made by polymerizing an ethylenically unsaturated monomer having a hydroxyl group and a hydrophobic monomer which is free from a hydroxyl group, and when the non-crosslinked polymer is added to the crosslinked polymer, excellent fixability to a recording medium may be secured.

Fixability in this instance means that the polymer is softened by heating, specifically, by heating to 50° C. or more, and adheres to a recording medium.

In this case, the magnetic powder is included in the magnetic polymer particle. However, when the magnetic powder is exposed on the surface of the particle, fixing with suppressed fluctuation (uniform fixing) is difficult and, also after the fixing, irregularity on the surface of an image may be problematic in some cases. Accordingly, in order to improve the fixability, the magnetic powder is preferably localized as far as possible inside of the particle.

Here, "localized . . . inside of the particle" means that the magnetic powder substantially does not exist at least in a region of a depth of equal to or about 0.1 μm from a particle surface ("substantially does not exist" herein means that the content is equal to or about 10% by mass or less).

Further, the amount of hydroxyl groups in the magnetic polymer particles varies depending on the amount of the magnetic powder, and is defined as the amount of hydroxyl groups in polymer components (the crosslinked polymer and non-crosslinked polymer) excluding the magnetic powder. In the invention, the amount of hydroxyl groups included in the crosslinked polymer and non-crosslinked polymer and not in the magnetic powder is necessarily in the range of from equal to or about 0.1 mmol/g to equal to or about 5.0 mmol/g.

When the amount of hydroxyl groups is less than about 0.1 mmol/g, the dispersibility of the polymer particles in an aqueous medium is poor. On the other hand, when the amount of hydroxyl groups exceeds about 5.0 mmol/g, the swellability of the polymer particle in water becomes larger to be poor in the handling property.

The amount of hydroxyl groups is preferably in the range of from equal to or about 0.2 mmol/g to equal to or about 4.0 mmol/g and more preferably in the range of from equal to or about 0.3 mmol/g to equal to or about 3.0 mmol/g.

Furthermore, in order to obtain more excellent dispersibility in the aqueous medium, it is preferred that a carboxyl group is present on a particle surface in addition to the hydroxyl group. Therefore, a crosslinked component in a polymer that constitutes a particle desirably has a hydroxyl group and a carboxyl group. Specifically, it is preferred that, in the crosslinked polymer, the ethylenically unsaturated monomer further includes a monomer having a hydroxyl group and the hydrophobic monomer which is free from a hydroxyl group is further free from a carboxyl group.

The amount of the hydroxyl groups and the amount of the carboxyl groups in the magnetic polymer particle in this case are defined, according to the above, as an amount of hydroxyl groups and an amount of carboxyl groups included in the crosslinked polymer and the non-crosslinked polymer. The amount of the hydroxyl groups included in the crosslinked polymer and the non-crosslinked polymer is preferably in the range of from equal to or about 0.1 mmol/g to equal to or about 5.0 mmol/g, and the amount of the carboxyl groups is preferably in the range of from equal to or about 0.005 mmol/g to equal to or about 0.5 mmol/g.

That is, first, when the amount of the hydroxyl groups is set in a range following the case where the carboxyl groups are not included, excellent dispersibility in the aqueous medium and the swelling inhibition property of the polymer particle may be maintained. Furthermore, in this case as well, the amount of hydroxyl groups is preferably in the range of from equal to or about 0.2 mmol/g to equal to or about 4.0 mmol/g and more preferably in the range of from equal to or about 0.3 mmol/g to equal to or about 3.0 mmol/g.

On the other hand, when the amount of carboxyl groups is in the above range, in spite of smaller number of functional groups with respect to the hydroxyl groups, excellent dispersibility and selling inhibition effect in the aqueous medium may be obtained and even when the amount of hydroxyl groups varies the characteristics may be maintained.

The amount of carboxyl groups is preferably in the range of from equal to or about 0.008 mmol/g to equal to or about 0.3 mmol/g and more preferably in the range of from equal to or about 0.01 mmol/g to equal to or about 0.1 mmol/g.

The amount of the hydroxyl groups may be determined by conventional titration method. For example, the amount of the hydroxyl groups in a polymer may be determined by adding a prescribed amount of reagent, such as a solution of acetic anhydride in pyridine, to the polymer, heating the mixture, adding water to conduct hydrolysis, separating the mixture into particles and a supernatant using a centrifuge, and titrating the supernatant, for example, with an ehtanolic potassium hydroxide solution using an indicator such as phenolphthalein.

On the other hand, the amount of the carboxyl groups may also be determined by a conventional titration method. For instance, the amount of the carboxyl groups in a polymer may be determined by adding a prescribed amount of a reagent, such as an ethanol solution of potassium hydroxide, to the polymer to neutralize, separating the mixture into particles and a supernatant using a centrifuge, and titrating the supernatant including excessive potassium hydroxide, for example, with an isopropanol-hydrocholoric acid solution using an automatic titrator.

When the carboxyl group forms a salt structure described below ($-COO^-Y^+$; here $Y^+$ represents an alkaline metal ion, an alkaline earth metal ion, or an organic cation such as ammonium), the amount of carboxyl groups may be determinedly, after the salt is converted into a carboxylic acid with an acid such as hydrochloric acid, carrying out the titration.

That is, an amount of carboxyl groups in the exemplary embodiment, when the carboxyl groups form a salt structure, is an amount of carboxyl groups including carboxyl groups contributing to the salt structure.

An amount of the crosslinked polymer is preferably in the range of from equal to or about 0.5% by mass to equal to or about 49.5% by mass with respect to the crosslinked polymer and the non-crosslinked polymer excluding the magnetic powder. When the amount of the crosslinked polymer having a hydroxyl group and the like is set in the above range, excellent fixability may be secured without causing the swelling of the polymer particle in water.

The amount of the crosslinked polymer is preferably in the range of from equal to or about 1% by mass to equal to or about 49% by mass with respect to the crosslinked polymer and the non-crosslinked polymer excluding the magnetic powder, and more preferably in the range of from equal to or about 5% by mass to equal to or about 25% by mass.

The amount of the crosslinked polymer may be determined by using difference in the solubility of the crosslinked polymer and the non-crosslinked polymer in tetrahydrofuran (THF). That is, the magnetic polymer particle is separated by using THF into a soluble portion (non-crosslinked polymer-containing portion) and an insoluble portion (crosslinked polymer-containing portion) and masses of the respective portions are measured to obtain the amount of the crosslinked polymer.

Specifically, about 1.0 g (A g) of the magnetic polymer particles in which an amount of magnetic powder is C % by mass is measured. To this, 50 g of THF is added followed by allowing the mixture to stand still at approximately 20° C. for about 24 hr. The mixture is separated by using a centrifuge followed by filtering with known filter paper (filter paper according to JIS P3801, 5-C) used for quantification analysis of fine components (that is, filter paper which allows 100 ml of water to pass therethrough in 720 seconds or less, tears when a water pressure of 1.47 kPa or more (or 15 cm $H_2O$ or more) is applied thereto after 100 ml of water is passed therethrough, and does not allow particles of barium sulfate to pass therethrough and be present in a filtrate obtained by using the filter paper when visually observed). A solvent content of a filtrate is vacuum dried, and an amount (B g) of a residue that is a resin component is measured. The amount of the residue is the THF-soluble portion.

From the above, the THF-insoluble portion is obtained from the following Equation (1).

$$\text{THF-insoluble portion (g)} = [A \times C/100)] - B \quad \text{Equation (1)}$$

Accordingly, an amount (%) of the crosslinked polymer may be calculated from the following Equation (2) by dividing the THF-insoluble portion by a mass of a total polymer (crosslinked polymer and non-crosslinked polymer), that is $[A-(A \times C/100)]$.

$$\text{amount of crosslinked polymer (\%)} = \{1 - B/[A-(A \times C/100)]\} \times 100 \quad \text{Equation (2)}$$

Furthermore, the amount of the magnetic powder in the magnetic polymer particle in the exemplary embodiment is in the range of from equal to or about 2.5% by mass to equal to or about 50% by mass, preferably in the range of from equal to or about 3.0 to equal to or about 40% by mass and more preferably in the range of from equal to or about 5.0% by mass to equal to or about 30% by mass.

When the amount is less than about 2.5% by mass, a necessary magnetic force may not be obtained. On the other hand, when the amount exceeds 50% by mass, uniform dispersibility in a particle of the magnetic powder and the dispersion stability of the polymer particles may not be obtained.

In the exemplary embodiment, the magnetic powder is preferably uniformly dispersed in the magnetic polymer particle. However, "uniformly dispersed" herein refers to the region in which the magnetic powder is localized in a particle. Here, "uniformly" with respect to the dispersion means a state in which an aggregate having a size of equivalent to ten or so of primary particles of the magnetic powder gathered together, is not present in a system. The same applies to the following.

In this case, the amount of the magnetic powder is preferably not greatly dependent on particle diameter (that is, the amount of the magnetic powder does not greatly vary depending on the particle diameter). Specifically, a ratio (P/Q) of the amount of magnetic powder (P % by mass) in magnetic polymer particles having a number-average particle diameter of equal to or about 2 µm and the amount of magnetic powder (Q % by mass) in magnetic polymer particles having a number-average particle diameter of equal to or about 5 µm is preferably equal to or about 0.5 or more and more preferably in the range of from equal to or about 0.6 to equal to or about 1.0. When the amount of magnetic powder is set within the above prescribed range irrespective of the particle diameter, an advantage arises in that the developing ability may more easily controlled when using the magnetic polymer particles in magnetography.

Furthermore, the state of the magnetic powder on a particle surface may be confirmed by observing the surface with an electron microscope. In the magnetic polymer particle according to the exemplary embodiment of the invention, it is preferably that magnetic powder is not found to project from the surfaces of any of the observed polymer particles. In this regard also, the fact that the magnetic polymer particles according to the exemplary embodiment of the invention include a polymer having a hydroxyl group and a non-crosslinked polymer effectively contributes to the surface condition.

The magnetic polymer particles in the exemplified embodiment are particulate and preferably has a number average particle diameter of equal to or about 0.5 µm or more. Specifically, the number average particle diameter is preferably in the range of 0.5 µm to 5 µm and more preferably in the range of from equal to or about 1.0 µm to equal to or about 4.0 µm.

When the number average particle diameter is equal to or about 0.5 µm or more, the magnetic polymer particles may be conveniently handled, and, in a production method described below, a number of hydroxyl group introduced to the polymer particle and an amount of the magnetic powder may be readily controlled.

The number average particle diameter is a value obtained by photographing dry particles with an optical microscope or an electron microscope, measuring the diameters of 100 to 200 particles chosen randomly from the particles in the photograph, and dividing the sum total of the diameters by the number of the particles measured.

The magnetic polymer particles according to the exemplary embodiment of the invention have excellent water dispersibility. The water dispersibility may be evaluated by observing a particle state when the magnetic polymer particles are put in water equal to or about 20 times the mass of the polymer particles and stirred. In this case, a glass vessel having an aperture area of equal to or about 1 cm$^2$ to equal to or about 10 cm$^2$ is used as the vessel for storing the water. In the evaluation, all of the magnetic polymer particles are preferably excellently dispersed in water after agitation, without any floating on the water surface or precipitating at a vessel wall surface.

In the exemplary embodiment, when the magnetic polymer particle has a carboxyl group both at a surface and inside of the particle, at least part of the carboxyl group preferably forms a salt structure. In particular, in the case of a particle having a small amount of hydroxyl groups, it is effective if the hydroxyl groups form the salt structure from the viewpoint of the water dispersibility.

Here, a "salt structure" means that hydrogen in a carboxyl group is substituted by an alkaline metal ion, an alkaline earth metal ion, or an organic cation such as ammonium, to form a carboxylate. In the invention, part of the carboxyl groups of the magnetic polymer particle may form the salt structure, or all of the carboxyl groups may form the salt structure. It is more preferable that all of the carboxyl groups form the salt structure.

The magnetic powder, the ethylenically unsaturated monomers and the like which are used in the exemplary embodiment of the invention will be described in detail in the following with respect to a method of producing the magnetic polymer particle according to an exemplary embodiment of the invention.

The method of producing the magnetic polymer particle according to an exemplary embodiment of the invention is not particularly restricted. A method that uses a dry melt kneading-pulverizing process may be used, or various wet production methods may be used. However, the following method of producing the magnetic polymer particle according to the exemplary embodiments of the invention is preferred from the viewpoint of obtaining small diameter polymer particles.

Method of Producing Magnetic Polymer Particle

The present inventors have studied a method of obtaining the magnetic polymer particles. As a result, it was found that, when a hydrophobic monomer and a monomer having a hydroxyl group are mixed and suspension polymerized in water, particles are apt to agglomerate during the polymerization, and it is difficult to obtain a polymer having a desired copolymerization ratio. The reason for this is that the monomer having a hydroxyl group is diffused from oil drops, which are dispersed in the water as a monomer mixture, to the water as well, so as to polymerize in the water in addition to in the oil drops.

When the polymer includes a hydrophobic component, it is difficult to include the magnetic powder in the polymer particle since the surface of the magnetic powder is relatively hydrophilic and, further, when a hydrophobic monomer polymerization component and a hydrophilic monomer polymerization component are phase separated in the polymer particle, the dispersibility of the magnetic powder tends not to be uniform. Furthermore, when the amount of hydroxyl groups in a particle is too small, the re-dispersibility of the obtained polymer particles in water tends to be deteriorated.

In view of the above problems, the present inventors have attempted (1) to enable a monomer mixture to exist in the form of stable and uniform suspension particles in an aqueous medium, (2) to improve the dispersibility of the magnetic powder in the monomer mixture, and (3) to inhibit the particles from agglomeration during the polymerization.

First, regarding item (1), it was found that when monomers are mixed so that A parts by mass of a monomer having a hydroxyl group, B parts by mass of a hydrophobic monomer free from a hydroxyl group, D parts by mass of a crosslinking agent, and E parts by mass of a non-crosslinked polymer satisfy the relationship (A+B+D)<E, suspension particles that are stable in aqueous medium may be formed.

Furthermore, regarding item (2), the surface of the magnetic powder is subjected to hydrophobizing treatment. As mentioned above, the surface of the magnetic powder is basically hydrophilic. Accordingly, when the magnetic powder is subjected to hydrophobizing treatment, the affinity thereof with the hydrophobic monomer may be increased and the dispersion uniformity nd the amount of magnetic powder in the particles may be increased. Furthermore, it was also found that, when the magnetic powder is dispersed in advance in at least part of the non-crosslinked resin, localization inside particles of the magnetic powder can be promoted.

Furthermore, in the above case as well, the diffusion of the monomer (including the magnetic powder in some cases) from the suspension particles into the aqueous medium may be inhibited by dissolving a salt in the aqueous medium so that, owing to the salting-out effect, a monomer mixture including a hydrophilic monomer may be disposed in an oil layer in a suspension polymerization system.

On the other hand, regarding item (3), it may be said that because the dissolution of a salt in the aqueous medium inhibit generation of emulsion polymerization occurring during the suspension polymerization, it has an effect also on agglomeration of particles. Moreover, it has been found that addition of a dispersion stabilizer into an aqueous medium may inhibit agglomerated particles from further agglomerate together.

According to items (1) to (3), magnetic polymer particles having the preferred performance may be obtained.

That is, in the invention, the effects of items (1) to (3) can be exerted when the following four conditions are met: control of the mixing amounts of a monomer having a hydroxyl group, a hydrophobic monomer not having a hydroxyl group, a crosslinking agent, and a non-crosslinked polymer; hydrophobizing treatment of the surface of the magnetic powder; dissolution of a salt in an aqueous medium; and addition of a dispersion stabilizer. Accordingly, a stable polymerization reaction in suspension particles that include the hydrophilic monomer, the hydrophobic monomer, and the magnetic powder may be realized while also preventing fluctuation (i.e., uniformly dispersed).

By satisfying these conditions, magnetic polymer particles in which the magnetic powder is dispersed at a desired amount while suppressing fluctuation (i.e., uniformly dispersed) and which have excellent water dispersibility and fixability may be produced readily and at an excellent yield.

Hereinafter, a method of producing the hydroxyl group-containing magnetic polymer particles according to the exemplary embodiment of the invention will be described in detail with reference to exemplary embodiments.

Crosslinked Polymer

The "crosslinked polymer" used in the invention is a polymer formed by polymerization of one or more ethylenically unsaturated monomers. The "ethylenically unsaturated monomer" in the invention means a monomer having an ethylenically unsaturated group such as a vinyl group. A monomer having a hydroxyl group, a monomer having a carboxyl group, and a hydrophobic monomer free from a hydroxyl group or a hydrophobic monomer free from a hydroxyl group and a carboxyl group are included in the scope of the ethylenically unsaturated monomer.

Preparing a Mixture

Monomer Having a Hydroxyl Group

Examples of the monomer having a hydroxyl group to be used in the exemplary embodiment of the invention include 2-hydroxylethyl(meth)acrylate, 2-hydroxypropyl(meth)acrylate, 3-hydroxypropyl(meth)acrylate, glycerin di(meth)acrylate, 1,6-bis(3-acryloxy-2-hydroxypropyl)-hexyl ether, pentaerythritol tri(meth)acrylate, tris-(2-hydroxyethyl)isocyanurate (meth)acrylate and polyethylene glycol (meth)acrylate.

Here, the (meth)acrylate represents an acrylate or a methacrylate. This is same in the following as well.

It is preferably, from the viewpoints, for example, of control of a copolymerization ration with a hydrophobic monomer mentioned later and controllability of polymerization reaction, to use at least one selected from 2-hydroxyethyl (meth)acrylate and polyethylene glycol (meth)acrylate.

Monomer Having a Carboxyl Group

As mentioned above, a magnetic polymer particle according to the exemplary embodiment of the invention desirably ahs a hydroxyl group and a carboxyl group in a polymer. In this case, an ethylencially unsaturated monomer desirably further include a monomer having a carboxyl group.

Examples of the monomer having a carboxyl group to be used in the exemplary embodiment of the invention include acrylic acid, methacrylic acid, methacryloyloxyethyl monophthalate, methacryloyloxyethyl monohexahydrophthalate, methacryloyloxyehtyl monomaleate and methacryloyloxyethyl monosuccinate.

Among these, methacryloyloxyethyl monophthalate is preferably used from the viewpoints of control of a copolymerization ratio with a hydrophobic monomer mentioned later, dispersion of the magnetic powder in a polymer particle, and the controllability of a polymerization reaction.

Hydrophobic Monomer Free from a Hydroxyl Group

Examples of the hydrophobic monomer free from a hydroxyl group include: aromatic vinyl monomers such as styrene or α-methylstyrene; (meth)acrylic acid alkyl esters having an alkyl group or an aralkyl group, each of which having 1 to 18 carbon atoms, and more preferably 2 to 16 carbon atoms (such as methyl(meth)acrylate, ethyl(meth)acrylate, propyl(meth)acrylate, butyl(meth)acrylate, cyclohexyl(meth)acrylate, 2-ethylhexyl(meth)acrylate, lauryl (meth)acrylate, or benzyl(meth)acrylate); (meth)acrylic acid alkoxyalkyl esters having 1 to 12 carbon atoms, and more preferably 2 to 10 carbon atoms (such as methoxymethyl (meth) acrylate, methoxyethyl(meth)acrylate, ethoxymethyl (meth)acrylate, ethoxyethyl (meth)acrylate, ethoxybutyl (meth)acrylate, n-buthoxymethyl(meth)acrylate, or n-buthoxyethyl(meth)acrylate); amino group-containing (meth)acrylate acid esters such as diethylaminoethyl(meth) acrylate or dipropylaminoethyl (meth)acrylate; acrylonitrile; ethylene; vinyl chloride; and vinyl acetate.

Among these, styrene, methyl(meth)acrylate, butyl(meth) acrylate, 2-ethylhexyl(meth)acrylate, lauryl(meth)acrylate, ethoxybutyl(meth)acrylate, benzyl(meth)acrylate and diethylaminoethyl(meth)acrylate are desirable, and styrene, methyl(meth)acrylate and butyl(meth)acrylate are particularly preferred.

When the ethylenically unsaturated monomer includes a monomer having a carboxyl group, the hydrophobic monomer free from a hydroxyl group is made a hydrophobic monomer further free from a carboxyl group. Basically, the hydrophobic monomer free from a hydroxyl group is used the hydrophobic monomer further free from a carboxyl group.

An amount of a hydrophobic monomer capable of copolymerizing with the monomer having a hydroxyl group is preferably in the range of from equal to or about 1% by mass to equal to or about 99% by mass with respect to the entirety of the monomer components, and more preferably in the range of from equal to or about 5% by mass to equal to or about 95% by mass.

Furthermore, when, in addition to the monomer having a hydroxyl group, a monomer having a carboxyl group is used as the ethylenically unsaturated monomer, an amount of a hydrophobic monomer capable of copolymerizing with these monomers is preferably in the range of from equal to or about 20% by mass to equal to or about 99% by mass with respect to the entire monomer components, and more preferably in the range of from equal to or about 50% by mass to equal to or about 90% by mass.

When the amount is set in the above range, a polymerization in which the fluctuation is suppressed between particles and inside of the particle (uniform polymerization) may be realized and, as a polymer particle as well, an improvement in the dispersibility to the water may be obtained.

Still furthermore, examples of other ethylencially unsaturated monomers include acrylic amides and glycidyl (meth) acrylate. The other ethylenically unsaturated monomers may be used in addition to the monomer having a hydroxyl group and the hydrophobic monomer, as required.

Crosslinking Agent

In the method of producing the magnetic polymer particle of aspects of the invention, a crosslinking agent is necessarily mixed with a reactive mixture (including the ethylenically unsaturated monomer and the like) dispersed in an aqueous medium described below. When the crosslinking agent is added in a monomer mixture solution, the agglomeration during polymerization may be suppressed and the dispersion stability may be secured. Furthermore, when an addition amount of the crosslinking agent in a monomer mixture solution is controlled, the swellability to water caused by the hydroxyl group may be controlled.

As the crosslinking agents to be used, known crosslinking agents may be selected and used. Preferable examples thereof include divinyl benzene, ethylene glycol di(meth)acrylate, diethylene glycol di(meth)acrylate, methylene bis(meth) acrylaide, glycidyl(meth)acrylate and 2-([1'-methylpropylideneamino]carboxyamino)ethyl methacrylate. Among these, divinyl benzene, ethylene glycol di(meth)acrylate and diethylene glycol di(meth)acrylate are desirable, and divinyl benzene is particularly preferable.

An addition amount of the crosslinking agent is, with respect to 100 parts by mass of entire monomer components, preferably in the range of from equal to or about 0.1 parts by mass to equal to or about 100 parts by mass, and more preferably in the range of from equal to or about 0.5 parts by mass to equal to or about 50 parts by mass.

Non-Crosslinked Resin the non-crosslinked resin to be used in the exemplary embodiment of the invention is not particularly limited insofar as it is a polymer that may fix particles on a fixing medium such as paper or film by means of external energy such as heat, UV-rays or electron beams, solvent vapor, sublimation of a solvent from the polymer, or the like. The magnetic polymer particle of the invention includes a non-crosslinked polymer. The non-crosslinked polymer is made by using the non-crosslinked resin as a raw material. When the non-crosslinked resin does not react with the other monomers in the suspension polymerization described below, the non-crosslinked resin is used as the non-crosslinked polymer.

Examples of the non-crosslinked resins include hemopolymers and copolymers of, for example: styrenes such as styrene and chlorostyrene; moncolefines such as ethylene, propylene, butylene, and isoprene; vinyl esters such as vinyl acetate, vinyl propionate, vinyl benzoate, and vinyl acctate; α-methylene aliphatic monocarboxylic acid esters such as methyl acrylate, ethyl acrylate, butyl acrylate, dodecyl acrylate, octyl acrylate, phenyl acrylate, methyl methacylate, ethyl methacrylate, butyl methacrylate, and dodecyl methacrylate; vinyl ethers such as vinyl methyl ether, vinyl ethyl ether, and vinyl butyl ether; and vinyl ketones such as vinyl methyl ketone, vinyl hexyl ketone, and vinyl isopropenyl ketone.

Examples of particularly preferably polymers include polystyrene, styrene-acrylic acid alkyl copolymers, styrene-methacrylic acid alkyl copolymers, styrene-acrylonitrile copolymers, styrene-butadiene copolymers, styrene-maleic anhydride copolymers, polyethylene, and polypropylene. The example further include polyester, polyurethane, epoxy resins, silicone resins, polyamide, modified resin, paraffin, and waxes.

Among these, when in a particular polyesters used as the non-crosslinked polymer, the thermal fixing may be effectively carried out. As the polyester, for instance, a linear polyester resin made of a polycondensation in which bisphenol A and a polyvalent aromatic carboxylic acid are used as main monomer components may be preferably used.

Furthermore, a sytrene-acrylic acid alkyl copolymer and a styrene-methacrylic acid alkyl copolymer may also be preferably used because the physical properties may be readily controlled and a mixing and dispersion process of the magnetic powder described below may be conveniently carried out.

The non-crosslinked resin has a molecular weight (weight-average molecular weight) preferably in the range of from equal to or about $5.0 \times 10^3$ to equal to or about $1.0 \times 10^6$ and more preferably in the range of from equal to or about $1.0 \times 10^4$ to equal to or about $5.0 \times 10^5$. Furthermore, the glass transition temperature (Tg) thereof is preferably in the range of from equal to or about 30° C. to equal to or about 90° C. and more preferably in the range of from equal to or about 40° C. to equal to or about 80° C.

As mentioned above, in the invention, it is necessary to mix A parts by mass of a monomer having a hydroxyl group and B parts by mass of a hydrophobic monomer free from a hydroxyl group, D parts by mass of a crosslinking agent, and E parts by mass of a non-crosslinked resin so that the relationship $(A-B-D)<E$ is satisfied. Specifically, with the amount (that is, E parts by mass) of the non-crosslinked resin to be used set at equal to or about 100 parts by mass, A+B+D is preferably set in the range of from equal to or about 5 parts by mass to equal to or about 99 parts by mass, and more preferably in the range of from equal to or about 10 parts by mass to equal to or about 90 parts by mass.

Further, the ratio (A/B) of the amount of a monomer having a hydroxyl group (A parts by mass) and the amount of a hydrophobic monomer free from a hydroxyl group (B parts by mass) is preferably set in the range of from equal to or about 95/5 to equal to or about 5/95 and more preferably in the range of from equal to or about 90/10 to equal to or about 10/90.

Still further, when a monomer having a carboxy group is used as an ethylenically unsaturated monomer, with the amount of the monomer having a carboxyl group to be mixed being set at C parts by mass, the components are preferably mixed so that the relationship (A+B+C+D)<E is satisfied. Specifically, with the amount (E parts by mass) of the non-crosslinked reins to be used set at 100 parts by mass, A+B+C+D is preferably set in the range of from equal to or about 5 parts by mass to equal to or about 90 parts by mass and more preferably in the range of from equal to or about 10 parts by mass to equal to or about 90 parts by mass.

Furthermore, the ratio (A/C) of the amount of a monomer having a hydroxyl group (A parts by mass) and the amount of a monomer having a carboxyl group (C parts by mass) is set preferably in the range of from equal to or about 1000/1 to equal to or about 10/1 and more preferably in the range of from equal to or about 1000/5 to equal to or about 10/1.

In this case, the ratio ((A+C)/B) of the amount of a monomer having a hydroxyl group (A parts by mass), the amount of a monomer having a carboxyl group (C parts by mass) and the amount of a hydrophobic monomer free from a hydroxyl group and a carboxyl group is preferably set in the range of from equal to or about 95/5 to equal to or about 5/95 and more preferably in the range of from equal to or about 90/10 to equal to or about 10/90.

Magnetic Powder

As the magnetic powder, magnetic, ferrite, or the like expressed by a formula $MO \cdot Fe_2O_3$ or $M \cdot Fe_2O_4$, which is magnetic, may be preferably used. Here, M represents a divalent or a monovalent metal ion (such as Mn, Fe, Ni, Co, Cu, Mg, Zn, Cd or Li) and M may be a metal or a combination of metals. Examples of the magnetic powder include iron oxides such as magnetite, γ-iron oxide, Mn—Zn ferrite, Mn—Mg ferrite, Li ferrite and Cu—Zn ferrite. Among these, magnetite that is inexpensive is preferably used.

Furthermore, it is possible to employ non-magnetic metal oxides such as those using one or more metals selected from Mg, Al, Si, Ca, Sc, Ti, V, r, Mn, Fe, Co, Ni, Cu, Zn, Sr, Y, Sr, Zr, Nb, Mo, Cd, Sn, Ba, Pb, etc., and the aforementioned magnetic metal oxides. For example, $Al_2O_3$, $SiO_2$, CaO, $TiO_2$, $V_2O_5$, $CrO_2$, $MnO_2$, $Fe_2O_3$, CoO, NiO, CuO, ZnO, SrO, $Y_2O_3$, $ZrO_2$, etc. may be used as a non-magnetic metal oxide.

An average primary particle diameter of the magnetic powder before being subjected to the hydrophobizing treatment described below is preferably in the range of from equal to or about 0.02 μm to equal to or about 2.0 μm. When the average primary particle diameter of the magnetic powder is set in the range, the magnetic powder merely agglomerate and may be readily uniformly dispersed in a polymerizable monomer.

In the invention, magnetic powders must be hydrophobicized on their surfaces. The method of the hydrophobicizing treatment is not particularly restricted and it may be achieved, for example, by covering the surface of a magnetic powder with a hydrophobicizing agent such as various types of coupling agents, silicone oils, and resins. In particular, surface covering treatment using a coupling agent is preferred.

Examples of the coupling agent include silane coupling agents and titanium coupling agents. More preferably used are silane coupling agents. Silane compounds of a structure represented by the following formula (1) are particularly preferred:

$$R_m SiY_n \qquad \text{Formula (1)}$$

wherein R is an alkoxyl group, m is an integer of from 1 to 3, Y represents a hydrocarbon group such as an alkyl group, a vinyl group, a glycidoxy group, or a methacryl group, and n is an integer of from 1 to 3.

Specific example thereof include vinyltrimetoxysilane, vinyltriethoxysilane, γ-methacryloxypropyltrimethoxysilane, vinyltriacetoxysilane, methyltrimethoxysilane, methyltriethoxysilane, isobutyltrimethoxysilane, dimethyldimethoxysilane, dimethyldiethoxysilane, trimethylmethoxysilane, hydroxypropyltrimethoxysilane, phenyltrimethoxysilane, phenethyltrimethoxysilane, n-hexadecyltrimethoxysilane and n-octadecyltrimethoxysilane.

In particular, it is preferably to hydrophobicizing a magnetic powder by use of alkyltrialkoxysilane coupling agents represented by $C_pH_{2p+1}$—Si—$(OC_qH_{2q+1})_3$ wherein p is an integer of from 2 to 20 and q is an integer of from 1 to 3, or aralkyltrialkoxysilane coupling agents represented by $C_6H_5$—$C_rH_{2r}$—Si—$(OC_sH_{2s+1})_3$ wherein r is an integer of from 2 to 20 and s is an integer of from 1 to 3. The term "aralkyl" as used herein means a hydrocarbon group which has both an aromatic structure and an aliphatic structure. That is, an alkyl hydrogen atom has been substituted by a substituted or unsubstituted aryl group. Examples of such an aralkyl group include a benzyl group, a phenethyl group and an α-mesityl group.

When p and r in the respective formulae are in the ranges, a desired hydrophobic property may be imparted to the magnetic powder while avoiding congruence between the magnetic powders, and the magnetic powder may be uniformly dispersed in polymer particles. Furthermore, when q and s are in the ranges, the reactivity of a silane coupling agent is excellent, resulting in a desired hydrophobic property.

Among those mentioned above, the alkyltrialkoxysilane coupling agents represented by $C_pH_{2p+1}$—Si—$(OC_qH_{2q+1})_3$ are particularly preferably used in achieving a favorable dispersibility in polymerizable monomers.

The hydrophobicizing treatment of a magnetic powder, for example in the case of silane coupling agent treatment, may be conducted in conventional ways such as dry treatment in which a vaporized silane coupling agent is caused to react with a magnetic powder which has been transformed into a cloud-like form by stirring; wet treatment in which a magnetic powder is dispersed in a solvent and a silane coupling agent is dropped thereto to cause a reaction; or treatment in which a magnetic powder is dispersed in a solvent and then a silane coupling agent is added, followed by evaporation of the solvent by use of a distillation apparatus such as a rotary evaporator, thereby heat-treating the magnetic powder on which the silane coupling agent has been attached. The hydrophobicizing treatments may be suitably combined together.

The amount of the hydrophobicizing agent with which the magnetic powder is treated in the hydrophobicizing treatment in the invention is preferably within the range of from 0.05 to 20 parts by mass, and more preferably from 0.1 to 10 parts by mass based on 100 parts by mass of the magnetic powder.

The hydrophobized magnetic powder may be directly mixed with the polymerizable monomers and the like as will be described below. However, the hydrophobized magnetic powder is preferably mixed and dispersed in advance in the non-crosslinked resin by means of a known method such as a roll mil, a kneader or an extruder, followed by mixing the resultant product in the mixture of the polymerizable monomers and the like. In this case, the entire amount of the non-crosslinked resin may be used to disperse the magnetic powder, or part of the non-crosslinked resin may be used to mix and disperse the magnetic powder and, after that, the rest of the non-crosslinked resin may be added to the mixture solution including the polymerizable monomers and the like. Furthermore, the non-crosslinked resin used to mix and disperse the magnetic powder may be the same as or different from the non-crosslinked resin added later. As mentioned above, when the magnetic powder is dispersed in at least a part of the non-crosslinked resin in advance, localization of the magnetic powder inside the particles may be promoted.

As amount of the magnetic powder is determined depending on a necessary magnetic force. However, in the exemplary embodiment, the amount of the magnetic powder is preferably in the range of from equal to or about 2.5% by mass to equal to or about 50% by mass with respect to a total amount of the magnetic polymer particle components, and more preferably in the range of from equal to or about 5% by mass to equal to or about 30% by mass. When the amount is set in the range, a sufficient magnetic force may be obtained and the dispersion stability of the polymer particles in an aqueous medium may be increased.

Polymerization Initiator

Preferable examples of the polymerization initiator to be used in exemplary embodiments of the method of producing the magnetic polymer particle of the invention include azo type polymerization initiators and peroxide type polymerization initiators. Particularly, initiators soluble in oil are preferred.

Examples of azo type initiators soluble in oil include azobisisobutyronitrile (AIBN), 2,2'-azobis(2-methylbutyronitrile), 2,2'-azobis(2,4-dimethylvaleronitrile), dimethyl 2,2'-azobis(2-methylpropionate) and 1,1'-azobiseyelohexane-1-carbonitrile. Examples of peroxide type initiators soluble in oil include enzoyl perioxide, acetyl peroxide, decanoyl peroxide, lauroyl peroxide, o-methoxybenzoyl peroxide, p-chlorobenzoyl peroxide, 2,4-dichlorobenzoyl peroxide, diisopropyl percarbonate, di-2-ethylhexyl peroxidicarbonate, acetylcyclohexylsulfonyl peroxide, tert-butyl perisobutyrate, tert-butyl perpivalate, tert-butyl 2-perethylhexanoate, tert-butyl peroxide, tert-butylcumyl peroxide, dicumly peroxide, methyl ethyl ketone peroxide, cumene hydroperoxide and tert-butyl hydroperoxide.

The polymerization initiators may be used in any amount, but the amount thereof is preferably within the range of from equal to or about 0.05 parts by mass to equal to or about 10 parts by mass, and more preferably from equal to or about 0.1 parts by mass to equal to or about 5 parts by mass b asked on 100 parts by mass of the total monomer components.

Other Additives

In a mixture solution including the monomers and the like in the exemplary embodiment, an organic solvent may be added as required. The organic solvent which relatively merely dissolves in water, has billing temperatures higher than a polymerization temperature in a suspension polymerization described below, and does not inhibit the polymerization may be in principle used. It is preferred that the organic solvent is compatible with the monomer. Examples of such solvent include, but are not restricted to, hydrocarbons, alcohols, ketones, and ethers.

The hydrocarbons may be aliphatic hydrocarbons and aromatic hydrocarbons. Examples of the aliphatic hydrocarbon include hexane, heptane, octane, dodecane, cyclohexane, decahydronaphthalene, petroleum type hydrocarbons and naphthene type hydrocarbons. Examples of the aromatic hydrocarbon include toluene, xylene, diethylbenzene, and dodecylbenzene.

As the alcohol, aliphatic alcohols having from 8 to 24 (preferably from 12 to 22) carbon atoms may be used. Both acyclic aliphatic alcohols and alicyclic alcohols may be used. Moreover, both naturally occurring alcohols and synthetic alcohols (e.g., Ziegler alcohol and oxo alcohols) may be used. Alkyl group moieties may be in a straight chain form or a branched form.

As an acyclic aliphatic alcohol, saturated aliphatic alcohols and unsaturated alcohols may be used. Examples of such monocyclic saturated aliphatic alcohols include isoamyl alcohol, octyl alcohol, nonyl alcohol, decyl alcohol, undecyl alcohol, dodecyl alcohol (lauryl alcohol), tridecyl alcohol, tetradecyl alcohol, hexadecyl alcohol, octadecyl alcohol, nonadecyl alcohol and tetracosenyl alcohol. Examples of acyclic unsaturated aliphatic alcohols include octenyl alcohol, decenyl alcohol, dodecenyl alcohol, tridecenyl alcohol, pentadecenyl alcohol, oleyl alcohol, tetracosenyl alcohol, galdoleyl alcohol and linoleyl alcohol.

As an alicyclic alcohol, monocyclic aliphatic alcohols and polycyclic aliphatic alcohols may be used. Examples of such a monocyclic aliphatic alcohols include ethylcyclohexyl alcohol, a porpyleyclohexyl alcohol, octyleyclohexyl alcohol, nonylcylohexyl alcohol and stearylcyclohexyl alcohol. Examples of polycyclic aliphatic alcohols included adamantyl alcohol and dicyclohexyl alcohol.

As the ketones, aliphatic or aromatic ketones having from 4 to 22 carbon atoms, or preferably from 6 to 12 may be used. Regarding aliphatic ketones, both acyclic aliphatic ketones and alicyclic ketones may be used. Alkyl group moieties may be in a straight chain form or a branched form. Examples of the ketones include methyl ethyl ketone, diethyl ketone, dipropyl ketone, methyl amyl ketone, methyl hexyl ketone, and diisobutyl ketone.

As the ethers, aliphatic or aromatic ethers having from 6 to 22 carbon atoms, or preferably from 7 to 12 carbon atoms may be used. Regarding aliphatic ethers, both acyclic aliphatic ethers and alicyclic ethers may be used. Alkyl group moieties may be in a straight chain form or a branched form. Examples of the ethers include ethylene glycol dibutyl ether, methyl phenyl ether, butyl phenyl ether, and diethylene glycol dibutyl ether. One of the solvents may be used alone, or two or more of them may be used in combination.

The magnetic polymer particle according to the exemplary embodiment may include a dye, an organic pigment, carbon black, titanium oxide, or the like for coloration of the polymer. In this case, each of the respective additives may be directly mixed in the mixture of the monomers and the like in which the magnetic powder is dispersed. However, it is preferred that, in particular when a pigment such as the organic pigment, carbon black or titanium oxide is mixed, the pigment is mixed and dispersed in the non-crosslinked resin in advance by means of a known method such as a roll mill, a kneader or an extruder, and then mixed with the mixture of the polymerizable monomers and the like, in accordance with the case of the magnetic powder. In this case, the entire amount of the non-crosslinked resin may be used to disperse the pigment, or part of the non-crosslinked resin may be used to mix and dispose the pigment and the rest thereof may be added later to the mixture of the polymerizable monomers and the like. Furthermore, the non-crosslinked resin used to mix and disperse the pigment may be the same as or different from the non-crosslinked resin added later.

As a method of preparing the mixture including the respective monomers and the like, for instance, first, the ethylenically unsaturated monomer, the non-crosslinked resin, the polymerization initiator, and other necessary components are mixed to prepare a mixture solution of the monomers and the like. A mixing method is not particularly restricted.

Furthermore, the magnetic powder is disposed in the mixture solution by a known method. That is, a dispersing apparatus such as a ball mill, a sand mill, an attritor or a roll mill may be used. When a monomer component is separately polymerized in advance and the magnetic powder is dispersed in the resultant polymer, a kneader such as a roll mill, a kneader, a Banbury mixer or an extruder may be used.

The method of preparing a mixture is not restricted to those described above. For instance, a non-crosslinked resin in which a magnetic powder is mixed may be used when the mixture solution is prepared, so that the magnetic powder is mixed in this stage, or the monomer, the non-crosslinked resin and the magnetic powder may be mixed at once to form a mixture.

Suspending a Mixture in an Aqueous Medium
Aqueous Medium

As the aqueous medium in the exemplary embodiment of the invention, water or a medium prepared by adding a water-soluble organic solvent, such as methanol and ethanol, to water is preferably used. Use of only water is particularly preferred. In the case of adding a water-soluble organic solvent, the addition amount thereof, which depends on the properties of the monomers to be suspended, is preferably equal to or about 30% by mass or less, more preferably equal to or about 10% by mass or less of the entire solvent. When the addition amount is adjusted to equal to or about 30% by mass or less, it may be possible to maintain a preferable dispersion stability.

Salt

One feature of an exemplary embodiment of the invention is that a salt is dissolved in the aqueous medium. The reaction of emulsion polymerization is inhibited by a salting out effect, dispersion stability of suspension particle is obtained and, as a result, a good yield may be realized.

Although the salt to be dissolved may be either water-soluble inorganic salts or water-soluble organic slats, inorganic slats are particularly preferable because they may exert the salting cut effect effectively. Examples of the inorganic salts include sodium chloride, potassium chloride, potassium carbonate, calcium chloride, ammonium chloride, sodium sulfate, sodium acetate, ammonium sulfate, magnesium chloride, and magnesium sulfate. Among these, sodium chloride, potassium chloride, potassium carbonate, and a calcium chloride are more preferred, and sodium chloride is particularly preferred.

Regarding the amount of the salt to be added, from the viewpoint of dispersion stability, it is preferable to dissolve the salt in an amount of equal to or about 5% by mass or more, more preferably equal to or about 10% by mass or more, and even more preferably equal to or about 15% by mass or more with respect to the total dispersion medium.

When the amount of the dissolved salt is set at equal to or about 5% by mass or more, the salting-out effect may be sufficiently exerted, and the emulsion polymerization may be inhibited.

Dispersion Stabilizer

In exemplary embodiments of the method of producing the magnetic polymer particle of the invention, it is necessary that a dispersion stabilize is further present in the aqueous medium. As the dispersion stabilizer, a known dispersion stabilizer may be used. However, inorganic powder such as calcium carbonate or calcium phosphate may be preferably used because they may effectively increase the dispensability of suspension particles and may inhibit the particles from agglomerating. Furthermore, when a surface of the inorganic particle is coated by a surface modifier, the stability of the dispersion particles may be preferably increase. Still furthermore, in addition to the inorganic powder, a surfactant such as an anionic emulsifier, a nonionic emulsifier or a cationic emulsifier may be used together. However, when the surfactant is used together, the surfactant is preferably added in an amount less than a critical micellar concentration.

An addition amount of the dispersion stabilizer is, though not particularly restricted, preferably in the range of from equal to or about 1 to equal to or about 100 parts by mass with respect to 100 parts by mass of the mixture including the monomer, the magnetic powder, and the like, and more preferably in the range of from equal to or about 2 parts by mass to equal to or about 90 parts by mass. When the dispersion stabilizer is added in an amount of equal to or about 1 part by mass or more, an excellent dispersion state may be attained. On the other hand, when the dispersion stabilizer is added in an amount of equal to or about 100 parts by mass or less, generation of fine particles may be inhibited, to thereby attain suspension particles having a sharper particle size distribution.

To the aqueous medium in the invention, a viscosity enhancer may also be added in order to regulate the particle size of suspension particles. Polycarboxylic acid salts, such as sodium carboxymethylcellulose, sodium alginate and sodium polyacrylate, may be added as the viscosity enhancer.

The suspension of a mixture including the aforementioned monomers into an aqueous medium including the aforementioned salt, etc. (hereinafter occasionally referred to as a dispersion medium) may be conducted by the following way.

That is, a mixture including a hydrophilic monomer, a hydrophobic monomer, a non-crosslinked resin, a magnetic powder, a polymerization initiator, a crosslinking agent, and the like is put into and suspended in an aqueous medium in which the salt is dissolved and the dispersion stabilizer is present. As a suspension method, a known suspension method may be used. For example, mechanical suspension methods such as a method in which a special stirring blade, such as that used in a mixer, is rotated at a high speed to suspend the monomer or the like in the aqueous medium, a method in which suspension is carried out by a shearing force applied by a rotor-stator known as a homogenizer, or a method of ultrasonic suspension may be used.

In addition, an emulsifying method known as a membrane emulsification method in which a liquid added with the monomer and the like is prepared and then extruded to an aqueous medium through a porous membrane may also be used for the suspension process.

A mixing mass ratio of the mixture to be suspended and the dispersion medium (mixture/dispersion medium) is preferably set in the range of from equal to or about 10/100 to equal to or about 100/100, and the number average particle diameter of the suspended particles is preferably in the range of from equal to or about 0.5 µm to equal to or about 5.0 µm.

In the exemplary embodiments, particles including the suspended monomer, the magnetic powder, and the like are suspension polymerized to obtain magnetic polymer particles. The polymerization may be carried out not only under atmospheric pressure but also under a pressurized condition. The other reaction conditions may be applied as required and are not particularly restricted.

The reaction is preferably carried out in that, under atmospheric pressure, the suspension in which the suspension particles are dispersed is stirred at a reaction temperature in the range of from equal to or about 40° C. to equal to or about 100° C. for equal to or about 1 to equal to or about 24 hr, in view of obtaining polymer particles with a yield as high as equal to or about 80% or more.

According to the method, magnetic polymer particles including the magnetic powder may be obtained. In the producing method of the invention according to the exemplary embodiment of the invention, a mixture of the monomer and the like is dispersed in an aqueous medium in which a salt is dissolved and a dispersion stabilizer mainly made of an inorganic powder is added, resulting inhibition of generation of dispersion liquid drops having a size of less than equal to or about 0.5 μm. Accordingly, small particles having a particle diameter of less than equal to or about 0.5 μm are merely formed. As s result, the method of producing a magnetic polymer particle according to the exemplary embodiment of the invention is excellent not only in controllability of the amount of hydroxyl groups and the amount of carboxyl groups but also in that magnetic polymer particles each having a number average particle diameter of equal to or about 0.5 μm or more, which are preferable as the magnetic polymer particles according to the exemplary embodiment of the invention, may be readily obtained.

Thus obtained polymer particles may be directly washed and dried after the dispersion stabilizer is removed. When the ehtylenically unsaturated monomer includes a monomer having a carboxyl group, that is, when the polymer particles have, a carboxyl group in addition to the hydroxyl group, it is desirable to treat the polymer particles with a basic compound. By the treatment, the carboxyl group in the polymer particles is converted to a salt structure.

The salt structure may be formed by, for instance, treating the magnetic polymer particles with a basic compound under the presence of water, a mixture solution of water and an aqueous organic solvent, or an organic solvent. In the exemplary embodiment, the magnetic polymer particles in an aqueous dispersion solution may be treated by adding thereto a basic compound, or the magnetic polymer particles may be treated by mixing it with an aqueous dispersion solution in which a basic compound is dissolved.

As the basic compound, any of inorganic a basic compounds and organic basic compounds may be used. Specific examples thereof include: inorganic basic compounds such as sodium hydroxide, potassium hydroxide and ammonia, organic basic compounds such as tetraethyl ammonium hydroxide and tetraethyl ammonium hydroxide; alkyl amines such as basic trimethylamine, diethylamine, trimethylamine, tripropylamine and tributylamine; and alkanolamines such as monoethanolamine, methylethanolamine, diethanolamine, diisopropanolamine, triethanolamine, dimethylaminoethanol and morpholine.

One of the basic compounds may be used alone, or a combination of two or more of them may be used. Furthermore, from the viewpoint of easiness in removing the basic compound after the treatment, the inorganic basic compounds are preferably used.

In the exemplary embodiment, a sue amount of the basic compound is preferably set in the range of 0.1% by mass to 20% by mass with respect to the aqueous dispersion solution of the magnetic polymer particles. Furthermore, in the magnetic polymer particles obtained by the treatment with the basic compound, all of the carboxyl groups desirably form a salt structure. In general, the use amount of the basic compound is set in the above range and so as to be excessive with respect to the amount of carboxyl groups in the polymer particle.

In the case, the pH of the aqueous dispersion solution of the magnetic polymer particles is preferably about 9 or more and more preferably about 11 or more. A treatment temperature is not particularly restricted but may be in the range of from equal to or about 50° C. to equal to or about 80° C. A treatment time is, through not restricted, generally in the range of from equal to or about 0.5 to equal to or about 5 hr. Furthermore, a concentration of the magnetic particles in the treatment is, though not particularly restricted, generally in the range of from equal to or about 1% by mass to equal to or bout 50% by mass. When the magnetic polymer particles precipitate during the treatment, it is preferred to perform appropriate stirring. After the treatment, the basic compound is removed by washing with water.

In some cases, thus obtained magnetic polymer particles are diluted and dispersed in a solvent such as methanol after the polymerization or treatment, followed by separation by filtration, washing with water or a solvent, and isolating as particles by a usual process such as spray drying, drying under reduced pressure or freeze drying.

An amount of hydroxyl groups and a number average particle diameter of the magnetic polymer particles obtained according to the exemplary embodiment may be obtained according to methods described above. A preferable amount of hydroxyl groups and a preferable number average particle diameter of the polymer particles obtained by the method of producing the magnetic polymer particles follow the description for the magnetic polymer particles according to the exemplary embodiment of the invention.

When the number average particle diameter is measured, it is desirable that an agglomerated particle (particle in which a plurality of particles agglomerates, or particle deformed by sticking one particle to another particle) is not at all found.

The molecular weight (weight average molecular weight) of the magnetic polymer particle according to the exemplary embodiment of the invention may vary depending on its application. However, in a case of a non-crosslinking polymer, the molecular weight thereof is preferably within the range of from about 5,000 to about 1,000,000, and more preferably from about 10,000 to about 500,000.

The weight average molecular weight is measured by measuring the THF-soluble content by using the gel permeation chromatography (GPC). The measurement is carried out using an HLC-8120GPC, SC-8020 (all trade names, manufactured by Tosoh Corporation) as a GPC, two columns (TSKGEL SUPERHM-H (trade name, manufactured by Tosoh Corporation, 6.0 mmID×15 cm), and tetrahydrofuran (THF) as an eluant.

Aqueous Dispersion

The aqueous dispersion in the exemplary embodiment is a particle dispersion in which the magnetic polymer particles of the invention are dispersed in an aqueous medium such as water. In the magnetic polymer particles according to the exemplary embodiment of the invention, as mentioned above, the magnetic powder is dispersed in a particle while fluctuation is suppressed (i.e., uniformly disposed). Accordingly, the magnetic powder is merely present on a surface of the particle. Furthermore, since hydroxyl groups are present on a surface thereof, excellent water dispensability is exhibited. Accordingly, the aqueous dispersion of the invention may be used in various kinds of applications in which the dispersed particle characteristics described below may be exerted without fluctuation or with efficiently.

Hereinafter, the invention will be described with reference to exemplary embodiments.

As the aqueous medium, those described in the sequence polymerization step may be used.

In the production of an aqueous dispersion, various auxiliary materials that may be used in general aqueous dispersions, such as a dispersant, an emulsifying agent, a surfactant, a stabilizer, a wetting agent, a thickening agent, a foaming agent, a defoaming agent, a coagulant, a gelling agent, a sedimentation inhibitor, a charge control agent, an antistatic agent, an anti-aging agent, a softener, a plasticizer, a filler, a colorant, a flavorant, an adhesion inhibitor, and or a releasing agent may be used in combination.

The water dispensability of the magnetic polymer particles may be evaluated according to the above method. Excellent water dispensability of the magnetic polymer particles obtained according to the exemplary embodiment of the invention is described for the magnetic polymer particles of the invention.

In the exemplary embodiments, the particles dispersed in the aqueous dispersion may each have an average particle diameter in the range of from equal to or about 0.5 μm to equal to or about 5 μm and preferably in the range of from equal to or about 1 μm to equal to or about 4 μm.

Furthermore, a solid content concentration of the aqueous dispersion is, though not particularly restricted, preferably in the range of from equal to or about 1% by mass to equal to or about 50% by mass and more preferably in the range of from equal to or about 5% by mass to equal to or about 30% by mass with respect to the amount of an aqueous solvent of the aqueous dispersion. More specifically, the amount of the magnetic polymer particle is particularly preferably about 5.0% by mass to about 30% by mass with respect to the amount of an aqueous solvent of the aqueous dispersion.

In the above, the magnetic polymer particles and the producing method thereof of the invention and an exemplary embodiment of the aqueous dispersion are described in detail. The magnetic polymer particles and the aqueous dispersion thereof, which are obtained by the invention, may be preferably sued in applications such as image forming materials, magnetic fluids, diagnostic chemicals and drug carriers, viscosity control agents, resin forming materials, paint additives, crosslinking/hardening agents, and cosmetic additives. In particular, in the magnetic polymer particles, a definite amount or more of magnetic powder is dispersed while fluctuation is suppressed (i.e., uniformly, dispersed) and the dispensability in the aqueous medium is excellent due to hydroxyl groups on a surface. Thus, the magnetic polymer particles may be preferably used in magnetic ink or an image forming material used in a wet image forming method. Furthermore, by making use of the hydroxyl groups in the particles and on the particle surfaces, the magnetic polymer particles may be used as an intermediate for converting into desired functional groups.

Cartridge and Image Forming Unit

The aqueous dispersion according to the exemplary embodiment of the invention may be favorably used as an image forming recording solution that is one of several image forming materials.

The image forming recording solution is used for displaying an image on a recording medium in a recording system. Examples of the recording system include, but are not restricted to: inkjet systems in which ink drops are ejected from a head and mechanically transferred onto a piece of recording paper to display an image, such as thermal inkjet system, a bubble inkjet system, a piezo inkjet system, a microdot type inkjet system, an IRIS type inkjet system and a multi-nozzle type inkjet system and magnetography systems in which image recording particles develop an image from a magnetic latent image, followed by transferring the image onto a medium, and fixing the image on the recording medium.

Among these, an exemplary embodiment of an image forming apparatus using a magnetograph system in which the image forming recording solution is favorably used, and a cartridge used therewith will be briefly described with reference to the drawings.

Magnetography is a method in which pattern-like magnetic latent images such as characters and images are formed and the magnetic latent image is visualized by use of a magnetic toner to obtain a hard copy. FIG. 1 is a schematic configurational view showing an example of a portion of an image forming apparatus in which images are formed by magnetography. In the image forming apparatus, as shown in the drawing, a development roll (a liquid retaining unit) 10 retaining an image forming recording solution is brought into contact with a magnetic recording drum 20 to form an image.

First, on the magnetic recording drum 20 made mainly of Co—Ni magnetic plating, a magnetic recording head 22 records a magnetic latent image in response to an image signal, by a line scanning method.

Next, the development roll 10 retaining a recording solution is brought into contact with the magnetic recording drum 20 so that the magnetic latent image is visualized by the magnetic polymer particles. As the recording solution, the aqueous dispersion according to an exemplary embodiment of the invention is used. The recording solution is supplied to the development roll 10 by a recording solution coating roll (a liquid supplying unit) 16, part of which comes into contact with the recording solution 14 stored in a storage tank (a liquid storage container) 12 to retain the recording solution 14, and another portion of which comes into contact with the development roll 10 to apply the recording solution 14 to the development roll 10. Furthermore, the amount of the solution retained by the recording solution coating roll 16 is controlled by use of a metering blade 17.

As shown in FIG. 1, the development roll 10, the storage tank 12, the recording solution coating roll 16, the metering blade 17 and the like integrally form a cartridge 40.

Next, a visualized image on the magnetic recording drum 20 is transferred to a portion brought into contact with a transfer roll 24 and, simultaneously, at a contact portion between the transfer roll 24 to which a voltage is applied and the magnetic recording drum 20, a recording medium 30 is inserted, thereby transferring a visual image formed by the magnetic polymer particles on the recording medium. The transferred visual image formed by the magnetic polymer particles is transported without further treatment, and fixed on the recording medium 30 under heating and pressure by means of a fixing device (not shown).

On the other hand, residual toner on the magnetic recording drum 20 after the transfer is removed by a blade 26 and the magnetic latent image on the surface of the magnetic recording drum 20 is erased by a demagnetizing head 28. Recording solution remaining on a surface of the development roll 10 after development is scraped off by a cleaning blade 18, which is pressure contacted with a surface of the development roll 10, and then collected in the storage tank 12.

When, in an image forming apparatus that adopts above-exemplified magnetography method, an aqueous dispersion according to an exemplary embodiment of the invention, in which small particle size magnetic polymer particles are uniformly dispersed in a dispersing medium including water, is used as an image forming recording solution, not only a high quality image with excellent fixability is obtained but also pollution of the working environment by a non-aqueous solvent is prevented.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

EXAMPLES

The invention is described in detail below with reference to Examples, but the invention is not limited thereto. The terms "parts" and "%" used in the Examples are "parts by mass" and "% by mass," respectively, unless otherwise stated.
Preparation of Surface Treated Magnetic Powder
Magnetic Powder 1

To 150 parts of dry ethanol, 150 parts of magnetic powder (manufactured by Toda Kogyo Corp., trade name: MTS-010, average particle diameter: 0.13 µm) are added, and 2.5 parts of silane coupling agent (manufactured by Chisso Corporation, trade name: phenethyltrimethoxysilane) is further added. Then, the magnetic powder is ultrasonically dispersed. The ethanol is evaporated from the dispersion with a rotary evaporator, so that the magnetic particles are dried. Subsequently, the particles are heat treated at 150° C. for 5 hours. The thus-treated magnetic powder is not wettable with water (in other words, even when mixed with a small amount of water and stirred, it floats on the surface of the water without settling) and has a hydrophobicized surface. The resultant is called magnetic powder 1.
Magnetic Powder 2

To 600 parts of the hydrophobicized magnetic powder, 400 parts of styrene-acrylic resin (trade name: ESLEC P-SE-0020, manufactured by Sekisui Chemical Co., Ltd.) are added, followed by kneading the mixture by use of a pressure kneader, to thereby obtain magnetic powder 2 of which surface is covered with a resin.

Example 1

Production of Magnetic Polymer Particles 7 parts of hydroxyethyl methacrylate (manufactured by Wako Pure Chemical Industries Ltd.) 12 parts of a styrene monomer (manufactured by Wako Pure Chemical Industries Ltd.) 16 parts of n-butyl methacrylate, 40 parts of a styrene-acrylic resin (trade name: ESLEC P-SE-0020, manufactured by Sekisui Chemical Co., Ltd.), 34 parts of cyclohexanone and 1 part of divinylbenzene (manufactured by Wako Pure Chemical Industries Ltd.) are mixed. 1.33 parts of the magnetic powder are added to the mixture solution, and dispersed therein for 48 hr by use of a ball mill. To 90 parts of the magnetic powder dispersed therein for 48 hr by use of a ball mill. To 90 parts of the magnetic powder dispersion solution. 1.0 part of 2,2'-azobis {2,4-dimethylvaleronitrile} (trade name: V-65, manufactured by Wako Pure Chemical Industries Ltd.) are added as a polymerization imitator, thereby preparing a mixture including a monomer, a non-crosslinked resin and the magnetic powder.

In an aqueous solution obtained by dissolving 28 parts of sodium chloride in 132 parts of ion-exchanged water, 48 parts of calcium carbonate (trade name: LUMINUS, manufactured by Maruo Calcium Co. Ltd.) and 2.0 parts of carboxy methyl cellulose (trade name: CELLOGEN, manufactured by Daiichi Kogyo Seiyaku Co., Ltd.) are added as dispersion stabilizers, followed by dispersing for 24 hr by means of a ball mill to form a dispersion medium. The mixture is put in 200 parts of the dispersion medium, and the resultant product is emulsified at 8,000 rpm for 5 min by use of an emulsifying apparatus (trade name: HIGH-FLEX HOMOGENIZER, manufactured by SMT Co., Ltd.), to thereby obtain a suspension. A number average particle diameter of the suspension particles is 2.0 µm.

On the other hand, in a separable flask equipped with a stirrer, a thermometer, a cooling pipe, and a nitrogen introducing pipe, nitrogen is introduced through the nitrogen introducing pipe, to establish a nitrogen atmosphere in the flask. The suspension is put in the flask, and a reaction is carried out at 65° C. for 3 hr, followed by further heating at 70° C. for 10 hr, and cooling. A reaction solution is an excellent dispersion, and no aggregate is visually observed during the polymerization. To the reaction solution, an aqueous solution of 10% hydrochloric acid is added to decompose calcium carbonate, followed by applying solid-liquid separation by means of a centrifuge. The obtained particles are washed with 1,000 parts of ion-exchanged water, followed by passing through a sieve with an opening of 100 µm. After that, the resultant product is washed with 1,000 parts of ion-exchanged water, followed by washing with 500 parts of ethanol and ion-exchanged water, to thereby obtain magnetic polymer particle A.

After the magnetic polymer particle A is dried in an oven at 60° C., a yield amount of the magnetic polymer is measured and found to be 57 parts, that is, 83% by yield (rate).
Evaluation of Characteristics of Magnetic Polymer Particles
Amount of Magnetic Powder The magnetic polymer particle A is passed through a 1-µm nylon mesh to fractionate into a particle group A1 having an average particle diameter of 1 µm and a particle group A2 having an average particle diameter of 3 µm.

The weight decrease amount due to heating is measured with a thermo-gravimetric analyzer (TGA) for each of the particle groups. From the weight decrease amount, the amount of the magnetic powder in a particle is calculated for each of the particle groups, and it is found that the amount of the magnetic powder in the particle group A1 is 30% and the amount of the magnetic powder in the particle group A2 is 32%, that is, the respective amounts are substantially the same. The measurement by the TGA is carried out in such a manner that the temperature is increased at a rate of 10° C./min up to 600° C., after which the temperature is maintained at 600° C. for 10 min.
Amount of Hydroxyl Groups The magnetic polymer particle A is measured and put in a test tube equipped with a cap, followed by adding a prescribed amount of a pyridine (manufactured by Wako Pure Chemical industries Ltd.) solution of acetic anhydride (manufactured by Wako Pure Chemical Industries Ltd.), which is prepared in advance. The mixture is heated at 95° C. for 24 hr.

After that, distilled water is added thereto to hydrolyze the acetic anhydride in the test tube, followed by separating into particles and a supernatant at 3,000 rpm for 5 min by use of a centrifuge. The particles ar repeatedly washed by ultrasonic dispersion and centrifugal separation with ethanol (manufactured by Wako Pure Chemical Industries Ltd.) A supernatant and a washing solution are collected in a conical beaker, and phenolphthalein (manufactured by Wako Pure Chemical Industries Ltd.) is used as an indicator to titrate with an ethanolic solution of 0.1 M potassium hydroxide (manufactured by Wako Pure Chemical Industries Ltd.).

A blank test that does not use the magnetic polymer particles is also carried out and, from the difference thereof, the amount of hydroxyl groups (mmol/g) is calculated according to the following Equation (3).

$$\text{amount of hydroxyl groups} = (B-C) \times 0.1 \times f)/(w-(w \times D/100)) \quad \text{Equation (3)}$$

In Equation (3), B denotes the dropping amount (ml) in the blank test, C denotes the dropping amount (ml) of the sample, f denotes the factor of a potassium hydroxide solution, w denotes the weight (g) of particles and D denotes the amount (%) of the magnetic powder.

As a result, the amount of hydroxyl groups in the magnetic polymer particles A is found to be 0.68 mmol/g.

Amount of Crosslinked Polymer

The amount of the crosslinked polymer may be obtained by measuring an amount of a component in each of a THF soluble portion and a THF insoluble portion as mentioned above. When the amount of the crosslinked polymer is measured for the magnetic polymer particles A2 of which magnetic powder content is 32% according to the above-mentioned method, it is found to be 47% with respect to the crosslinked polymer and the non-crosslinked polymer.

Number Average Particle Diameter and Form of Particles

Based on a photograph taken by electron microscope observation of dry particles, the number average particle diameter of the magnetic polymer particles A is determined to be 2.0 μm. In the photograph, no agglomerated particles are found.

State of Magnetic Powder on the Surfaces of Particles

The state of the magnetic powder on the surface of the magnetic polymer particles A is checked with a scanning electron microscope (SEM). Specifically, when 100 particles are examined for their surface conditions at a magnification of 10,000, a state where the magnetic powder projects on the surface is not found in any particle.

Figure 2:
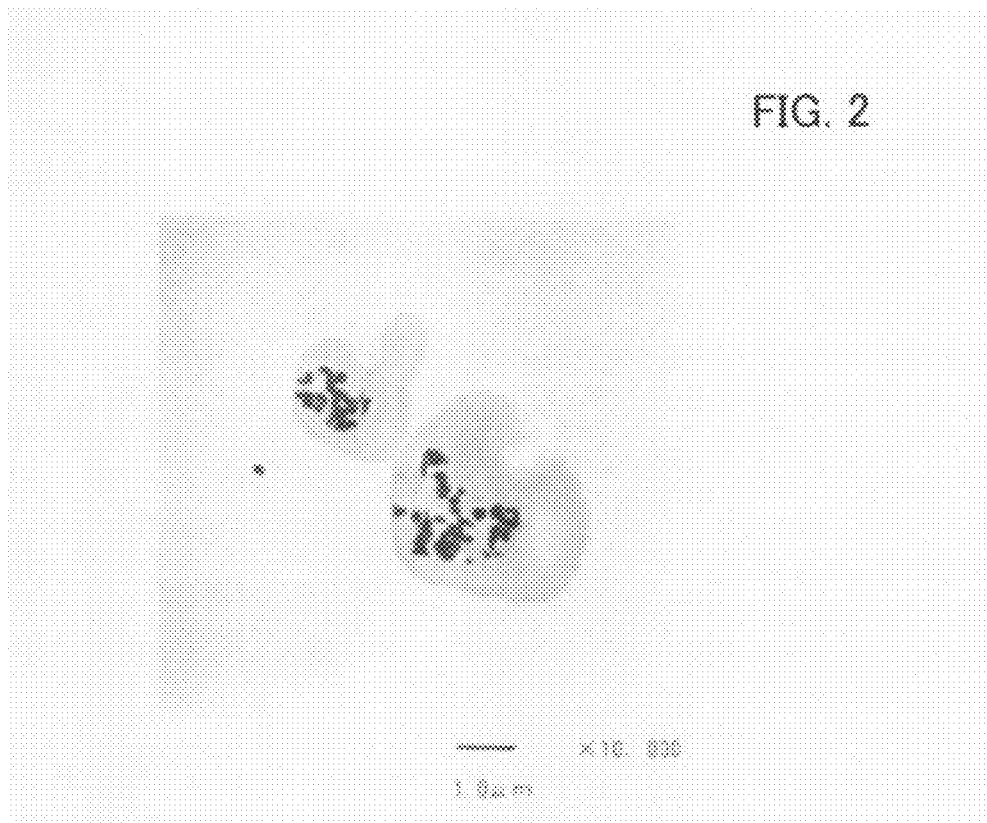
FIG. 2 is a transmission electron micrograph showing a section of a magnetic polymer particle in Example 1.

Furthermore, when a state of the magnetic powder inside of the particle is investigated by observing a cross section thereof with a transmission electron microscope (TEM), it is found that, as shown in a photograph of FIG. 2, the magnetic powder is localized in a center portion with an excellent dispersion state maintained.

Preparation and Characteristics of Aqueous Dispersion

One part of dry magnetic polymer particles A is put in 20 parts of pure water stored in a glass vessel having an aperture area of 4 cm² and stirred to produce an aqueous dispersion, in the aqueous dispersion, all of the particles are excellently re-dispersed in water, without any floating on the water surface or precipitating at a vessel wall surface.

Furthermore, when dispersion particle diameters of particles in the aqueous dispersion are measured by use of a laser diffraction particle size distribution analyzer (trade name: LA-700, manufactured by Horiba Ltd.), the number average particle diameter is 2.2 μm.

Fixing Properties

The magnetic polymer particles A are applied onto a slide glass, and the slide glass is covered with a cover glass. The slide glass is put in an oven at 130° C. for 3 min. After that, when the magnetic polymer particles on the slide glass are observed by use of an optical microscope, it is found that particles fuse together, an interface disappears and the slide glass and the cover glass are strongly adhered. From the results, it is found that the magnetic polymer particles A exhibits the fixability in response to heating.

Example 2

Production of Magnetic Polymer Particles 6 parts of hydroxyethyl methacrylate (manufactured by Wako Pure Chemical Industries Ltd.), 1 part of polyethylene glycol methacrylate (trade name: BLENMER PE200, manufactured by Nippon Oil & Fats Co., Ltd.), 15 parts of a styrene monomer (manufactured by Wako Pure Chemical Industries, Ltd.), 20 parts of n-butyl methacrylate, 55 parts of a styrene-acrylic resin (trade name: ESLEC P-SE-0020, manufactured by Sekisui Chemical Co., Ltd.), 30 parts of cyclohexanone and 1 part of divinylbenzene (manufactured by Wako Pure Chemical Industries Ltd.) are mixed. To the mixture solution, 2:22 parts of the magnetic powder (magnetic poser content: 60%) are added, further followed by dispersing for 24 hr by use of a trail mill. To 90 parts of the magnetic powder dispersion, 1 part of azobisisobutyronitrile (manufactured by Wako Pure Chemical Industries Ltd.) are added as a polymerization initiator, to thereby prepare a mixture including a monomer, a non-crosslinked resin and the magnetic powder.

In an aqueous solution obtained by dissolving 28 parts of sodium chloride in 132 parts of ion-exchanged water, 48 parts of calcium carbonate (trade name: LUMINUS, manufactured by Maruo Calcium Co., Ltd.) and 2.0 parts of carboxy methyl cellulose (trade name: CELLOGEN, manufactured by Dai-ichi Kigyo Seiyaku Co., Ltd.) are added as dispersion stabilizers, followed by dispersing for 24 hr by means of a ball mill to form a dispersion medium. The mixture is put in 200 parts of the dispersion medium, and the resultant product is emulsified at 8,000 rmp for 3 min by use of an emulsifying apparatus (trade name: ULTRA TURRAX, manufactured by IKA Works Inc.), to thereby obtain a suspension. A number average particle diameter of the suspension particles in 2.0 μm.

On the other hand, in a separable flask provided with a stirrer, a thermometer, a cooling pipe, and a nitrogen introducing pipe, nitrogen is introduced from the nitrogen introducing pipe, to establish a nitrogen atmosphere in the flask. The suspension is put in the flask, and a reaction is carried out at 65° C. for 3 hr, followed by further heating at 70° C. for 10 hr, and cooling. A reaction solution is an excellent dispersion and no aggregate is visually observed during the polymerization. To the reaction solution, an aqueous solution of 10% hydrochloric acid is added to decompose calcium carbonate, followed by applying solid-liquid separation by means of a centrifuge. The obtained particles are washed with 1,000 parts of ion-exchanged water, followed by repeating washing with 1,000 parts of ethanol, further followed by repeating substitution and washing with 1,000 parts of ion-exchanged water, to thereby obtain magnetic polymer particles B.

After the magnetic polymer particles B are dried in an oven at 60° C., a yield amount of the magnetic polymer particles is measured and found to be 60 parts, that is, 82% by yield (rate).

Evaluation of Characteristics of Magnetic Polymer Particles

Amount of Magnetic Powder

The magnetic polymer particles B are passed through a 1-μm nylon mesh according to Example 1 to fractionate into a particle group B1 having an average particle diameter of 1 μm and a particle group B2 having an average particle diameter of 3 μm. The amounts of the magnetic powders in the respective particle groups are calculated, and it is found that the amount of the magnetic powder in the particle group B1 is 15% and the amount of the magnetic powder in the particle group B2 is 16%, that is, the respective amounts are substantially the same.

Amount of Hydroxyl Groups and Amount of Crosslinked Polymer

In accordance with Example 1, an amount of hydroxyl groups of the magnetic polymer particles B and an amount of the crosslinked polymer thereof are measured. As a result, the amount of hydroxyl groups is 0.41 mmol/g, and the amount of the crosslinked polymer in the magnetic polymer particles B2 of which magnetic powder content is 16% is 38% with respect to the crosslinked polymer and the non-crosslinked polymer.

Number Average Particle Diameter and Form of Particles

In accordance with Example 1, based on a photograph taken by electron microscope observation of dry particles, the number average particle diameter of the polymer particles is determined to be 2.5 μm. In the photograph, no agglomerated particles are found.

Existing State of Magnetic Powder on Particle Surface and Inside of Particle

In accordance with Example 1, an existing state of magnetic poser on a particle surface is confirmed and a magnetic powder projected from a particle surface is not observed. Furthermore, in the sectional observation with a TEM as well, a photograph following FIG. 2 is obtained. That is, the magnetic powder is localized in a center portion with an excellent dispersion state maintained inside of the particle.

Preparation and Characteristics of Aqueous Dispersion

In accordance with Example 1, an aqueous dispersion is prepared from dry magnetic polymer particles B. In the aqueous dispersion, all of the particles are excellently re-dispersed in water, without any floating on the water surface or precipitation at a vessel wall surface.

Furthermore, when particle diameters of the particles dispersed in the aqueous dispersion are measured by use of a laser diffraction particle size distribution analyzer (trade name: LA-700, manufactured by Horiba Ltd.), the number average particle diameter is 2.8 μm.

Fixing Properties

The magnetic polymer particles B are applied onto a slide glass, and the slide glass is covered with a cover glass. The slide glass is put in an oven at 130° C. for 1 min. After that, when the magnetic polymer particles on the slide glass are observed by use of an optical microscope, it is found that particles fuse together, an interface disappears and the slide glass and the cover glass are strongly adhered. From the results, it is found that the magnetic polymer particles B have the fixabilty.

Example 3

Production of Magnetic Polymer Particles 6 parts of hydroxyethyl methacrylate (manufactured by Wako Pure Chemical Industries Ltd.), 1 parts of methacryloyloxyethyl monophthalate manufactured by Sigma Aldrich Corp.), 12 parts of a styrene monomer (manufactured by Wako Pure Chemical Industries Ltd.), 16 parts of n-butyl methacrylate and 1 part of divinylbenzene (manufactured by Wako Pure Chemical Industries Ltd.) are mixed. To the mixture, 1.33 parts of the magnetic powder are added, further followed by dispersing 40 parts of a styrene-acrylic resin (trade name: ESLEC P-SE-0020, manufactured by Sekisui Chemical Co., Ltd.) and 34 parts of cyclohexanone for 48 hr by use of a ball mill. To 90 parts of the magnetic powder dispersion, 1.0 part of 2,2'-azobis {2,4-dimethylvaleronitrile} (trade name: V-65, manufactured by Wako Pure Chemical Industries Ltd.) are added as a polymerization initiator, to thereby prepare a mixture including a monomer and the magnetic powder.

In an aqueous solution obtained by dissolving 28 parts of sodium chloride in 160 parts of ion-exchanged water, 30 parts of calcium carbonate (trade name: LUMINUS, manufactured by Maruo Calcium Co., Ltd.) and 3.5 parts of carboxy methyl cellulose (trade name: CELLOGEN, manufactured by Daiichi Kogyo Seiyaku Co., Ltd.) are added as dispersion stabilizers, followed by dispersing for 24 hr by means of a ball mill to form a dispersion medium. The mixture is put in 200 parts of the dispersion medium, and the resultant product is emulsified at 8,000 rmp for 3 min by an emulsifying apparatus (trade name: HIGH-FLEX HOMOGENIZER, manufactured by SMT Co., Ltd.), to thereby obtain a suspension. A number average particle diameter of the suspension particles is 2.0 μm.

On the other hand, in a separable flask provided with a stirrer, a thermometer, a cooling pipe, and a nitrogen introducing pipe, nitrogen is introduced from the nitrogen introducing pipe to establish a nitrogen atmosphere in the flask. The suspension is put in the flask, and a reaction is carried out at 65° C. for 3 hr, followed by further heating at 70° C. for 10 hr, and cooling. A reaction solution is an excellent dispersion and no aggregate is visually confirmed during the polymerization. To the reaction solution, an aqueous solution of 10% hydrochloric acid is added to decompose calcium carbonate, followed by applying solid-liquid separation by means of a centrifuge. The obtained particles are washed with 1,000 parts of ion-exchanged water, followed by passing through a sieve with an opening of 100 μm. The passed dispersion is adjusted to have pH of 12 by using 0.5N sodium hydroxide, followed by stirring for 1 hr at 20° C. (room temperature). After that, the resultant product is washed with 1,000 parts of ion-exchanged water, followed by washing with 500 parts of ethanol and ion-exchanged water, to thereby obtain magnetic polymer particles C.

After the magnetic polymer particles C are dried in an oven at 60° C., a yield amount of the magnetic polymer particles is measured and found to be 53 parts, that is, 80% by yield (rate).

Evaluation of Characteristics of Magnetic Polymer Particles

Amount of Magnetic Powder

The magnetic polymer particles C are passed through a 1-μm nylon mesh according to Example 1 to fractionate into a particle group C1 having an average particle diameter of 1 μm and a particle group C2 having an average particle diameter of 3 μm. The amounts of the magnetic powders in the respective particle groups are calculated, and it is found that the amount of the magnetic powder in the particle group C1 is 30% and the amount of the magnetic powder in the particle group C2 is 32%, that is, the respective amounts are substantially the same.

Amount of Hydroxyl Groups and Amount of Crosslinked Polymer

In accordance with Example 1, an amount of hydroxyl groups of the magnetic polymer particles C and an amount of the crosslinked polymer thereof are mentioned. As a result, the amount of hydroxyl groups is 0.4 mmol/g, and the amount of the crosslinked polymer in the magnetic polymer particles C2 of which magnetic powder content is 32% is 47% with respect to the crosslinked polymer and the non-crosslinked polymer.

Amount of Carboxyl Groups

The magnetic polymer particles C are re-dispersed in ion-exchanged water of an amount of 10 times that of the magnetic polymer particles C, followed by adjusting the pH to 3 by adding 1N hydrochloric acid. In this state, stirring is continued at 20° C. (room temperature) for 1 hr, followed by filtering, further followed by repeating washing with ion-exchanged water of an amount of 10 times that of the magnetic polymer particles C. After centrifugal separation, the resultant product is dried at 60° C. After measuring a weight of the obtained polymer particles, they are put in a test tube equipped with a cap, followed by adding a prescribed amount of a 0.1M ethanolic potassium hydroxide solution (manufactured by Wako Pure Chemical Industries Ltd.), further followed by allowing reacting at a temperature in the range of 20 to 25° C. (ambient temperature) for 3 hr.

After that, the resultant product is separated into particles and a supernatant by centrifugal separation at 3,000 rmp for 5 min. The particles are washed by repeatedly applying ultrasonic dispersion and centrifugal separation in ethanol (manufactured by Wako Pure Chemical industries Ltd.). The supernatant and the washing solution are collected in a conical beaker, followed by titrating with a 0.1M 2-propanolic hydrochloric acid solution (manufactured by Wako Pure Chemical Industries Ltd.) by using methyl orange (manufactured Wako Pure Chemical Industries Ltd.) as an indicator.

A blank test that does not use the magnetic polymer particles is also carried out, and, from the difference thereof, the amount of carboxyl groups (mmol/g) is calculated according to the following Equation (4).

$$\text{amount of carboxyl groups} = (E-F) \times 0.1 \times f/(x-(x \times G/100)) \qquad \text{Equation (4)}$$

In Equation (4), E denotes the dropping amount (ml) in the blank test, F denotes the dropping amount (ml) of the sample, f denotes the factor of a potassium hydroxide solution, x denotes the weight (g) of particles and G denotes the amount (%) of the magnetic powder.

Figure 3:
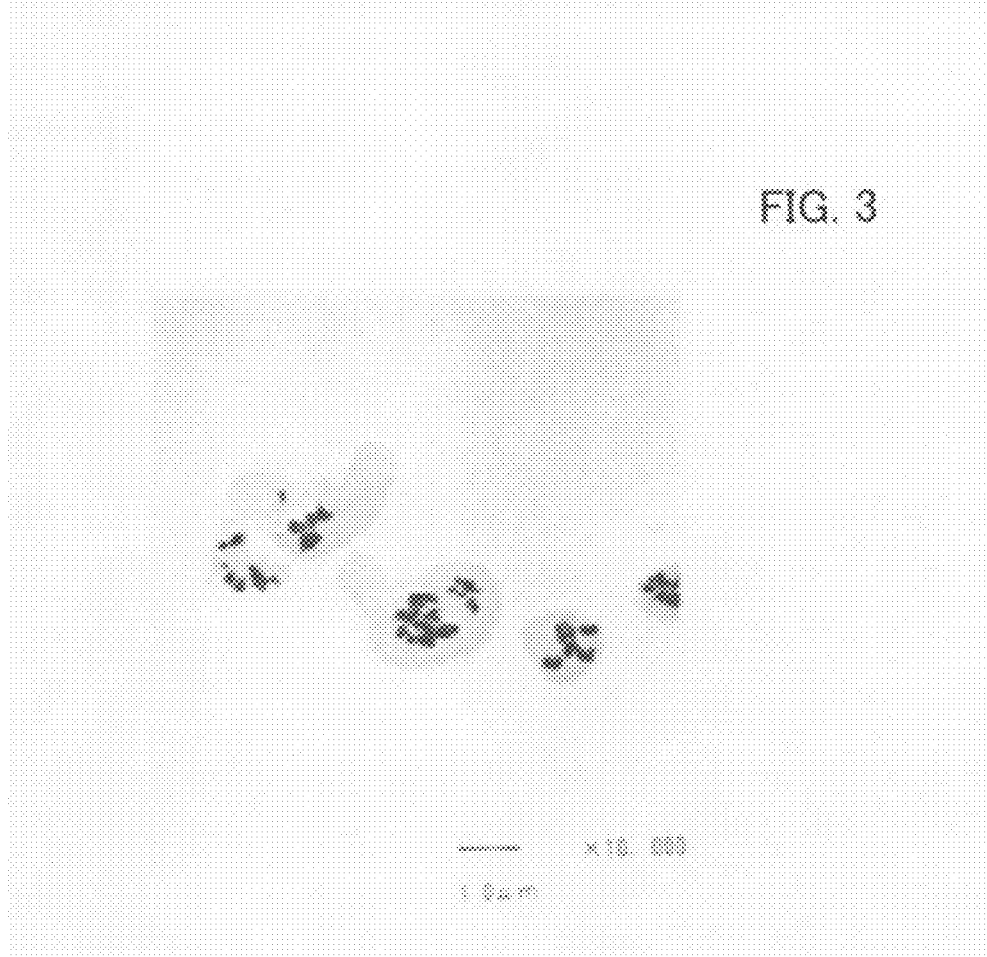
FIG. 3 is a transmission electron micrograph showing a section of a magnetic polymer particle in Example 3.

As a result, the amount of the carboxyl groups of the magnetic polymer particles C is found to be 0.05 mmol/g.
Number Average particle Diameter and Form of Particles In accordance with Example 1, based on a photograph taken by electron microscope observation of dry particles, the number average particle diameter of the polymer particles is determined to be 2.0 μm. In the photograph, no agglomerated particles are found.
Existing State of Magnetic Powders on particle Surface and Inside of particle In accordance with Example 1, an existing state of magnetic powders on a particle surface is confirmed and a magnetic powder projected from a particle surface is not observed. Furthermore, in the sectional observation with a TEM as well, as shown in FIG. 3, the magnetic powder is localized in a center portion thereof with an excellent dispersion state maintained inside of the particle.
Preparation and Characteristics of Aqueous Dispersion In accordance with Example 1, an aqueous dispersion is prepared from dry magnetic polymer particles C. In the aqueous dispersion, all of the particles are excellently re-dispersed in water, without any floating on the water surface of precipitating at a vessel wall surface. The dispersion is left still for one week, and settled and precipitated particles are again stirred. As a result, all of the particles are excellently re-disposed in water. Accordingly, the particles are excellent in the re-dispersibility.

Furthermore, when particle diameters of the particles dispersed in the aqueous dispersion are measured by use of a laser diffraction particle size distribution analyzer (trade name: LA-700, manufactured by Horiba Ltd.), the number average particle diameter is 3.2 μm.

Fixing Properties

The magnetic polymer particles C are applied onto a slide glass, and the slide glass is covered with a cover glass. The slide glass is put in an oven at 130° C. for 3 min. After that, when the magnetic polymer particles on the slide glass are observed by use of an optical microscope, it is found that particles fuse together, an interface disappears and the slide glass and the cover glass are strongly adhered. From the results, it is found that the magnetic polymer particles C have the fixability.

Example 4

Production of Magnetic Polymer Particles 6 parts of hydroxyethyl methacrylate (manufactured by Wako Pure Chemical Industries Ltd.), 1 part of polyethylene glycol methacrylate (trade name: BLENMER PE200, manufactured by Nippon Oil & Fats Co., Ltd.), 0.5 parts of methacryloyloxyethyl monophthalate (manufactured by Sigma Aldrich Corp.), 15 parts of styrene monomer (manufactured by Wako Pure Chemical Industries Ltd.), 20 parts of n-butyl methacrylate, 55 parts of styrene acrylic resin (trade name: ESLEC P-SE-0020, manufactured by Sekisui Chemical Co., Ltd.), 30 parts of cyclohexanone and 1 part of divinylbenzene (manufactured by Wako Pure Chemical Industries Ltd.) are mixed. To the mixture solution, 2:33 parts of the magnetic powder (magnetic powder content: 60%) are added, followed by dispersing for 24 hr by use of a bail mill. To 90 parts of the magnetic powder dispersion, 1 part of azobisisobutyronitrile (manufactured by Wako Pure Chemical Industries Ltd.) is added as a polymerization initiator, to thereby prepare a mixture including a monomer and the magnetic powder.

In an aqueous solution obtained by dissolving 28 parts of sodium chloride in 132 parts of ion-exchanged water, 48 parts of calcium carbonate (trade name: LUMINUS, manufactured by Maruo Calcium Co., Ltd.) and 2.0 parts of carboxy methyl cellulose (trade name: CELLOGEN, manufactured by Daiichi Kogyo Seiyaku Co., Ltd.) are added as dispersion stabilizers, followed by dispersing for 24 hr by means of a ball mill to form a dispersion medium. The mixture is put in 200 parts of the dispersion medium, and the resultant product is emulsified at 8,000 rpm for 3 min by use of an emulsifying apparatus (trade name; ULTRA TURRAX, manufactured by IKA Works Inc.), to thereby obtain a suspension. A number average particle diameter of the suspension particles is 2.0 μm.

On the other hand, in a separable flask provided with a stirrer, a thermometer, a cooling pipe, and a nitrogen introducing pipe, nitrogen is introduced from the nitrogen introducing pipe to establishes a nitrogen atmosphere in the flask. The suspension is put in the flask, and a reaction is carried out at 65° C. for 3 hr, followed by further heating at 70° C. for 10 hr, and cooling. A reaction solution is an excellent dispersion and no aggregate is visually observed during the polymerization. To the reaction solution, an aqueous solution of 10% hydrochloric acid is added to decompose calcium carbonate, followed by applying solid-liquid separation by means of a centrifuge. The obtained particles are washed with 1,000 parts of ion-exchanged water, followed by repeating washing with 1,000 parts of ethanol, further followed by substituting once more with 1,000 parts of ion-exchanged water. The pH is adjusted to 12 by adding 0.5N sodium hydroxide, followed by stirring at 20° C. (room temperature) for 1 hr. After that, the resultant product is washed with 1,000 parts of ion-exchanged water, followed by washing with 500 parts of ethanol and ion-exchanged water, to thereby obtain magnetic polymer particles D.

After the magnetic polymer particles D are dried in an oven at 60° C., a yield amount of the magnetic polymer particles is measured and found to be 59 parts, that is 80% by yield (rate).
Evaluation of Characteristics of Magnetic Polymer Particles
Amount of Magnetic Powder The magnetic polymer particles D are passed through a 1 μm nylon mesh according to Example 1 to fractionate into a particle group D1 having an average particle diameter of 1 μm and particle group D2 having an average particle diameter of 3 μm. The amount of the magnetic powders in the respective particle groups are calculated, and it is found that the amount of the magnetic powder in the particle group D1 is 15% and the amount of the magnetic powder in the particle group D2 is 16%, that is, the respective amounts are substantially the same.
Amount of Hydroxyl Groups, Amount of Carboxyl Groups and Amount of Crosslinked Polymer In accordance with Example 1 and 3, amount of hydroxyl groups and carboxyl groups and an amount of the crosslinked polymers in the magnetic polymer particles D are measured. As a result, the amount of hydroxyl groups is 0.42 mmol/g, the amount of carboxyl groups is 0.01 mmol/g, and the amount of the crosslinked polymer in the magnetic polymer particles D2 of which magnetic powder content is 16% is 39% with respect to the crosslinked polymer and the non-crosslinked polymer.
Number Average Particle Diameter and Form of Particles In accordance with Example 1, based on a photograph taken by electron microscope observation of dry particles, the number average particle diameter of the polymer particles is determined to be 2.1 μm. In the photograph, no agglomerated particles are found.
Existing State of Magnetic Powder on particle Surface and Inside of Particle In accordance with Example 1, an existing state of magnetic powder on a particle surface is confirmed and a magnetic powder projected from a particle surface is not observed. Furthermore, in the sectional observation with a TEM as well, a photograph following FIG. 3 is obtained. That is, the magnetic powder is localized in a center portion with an excellent dispersion state maintained inside of a particle.
Preparation and Characteristics of Aqueous Dispersion In accordance with Example 1, an aqueous dispersion is prepared from dry magnetic polymer particles D. In the aqueous dispersion, all of the particles are excellently re-dispersed in water, without any floating on the water surface or precipitating at a vessel wall surface. The dispersion is left still for one week, and settled and precipitated particles are again stirred. As a result, all of the particles are excellently re-dispersed in water. Accordingly, the particles are excellent in the re-dispensability.

Furthermore, when particle diameters of the particles dispersed in the aqueous dispersion are measured by use of a laser diffraction particle size distribution analyzer (trade name: LA-700, manufactured by Horiba Ltd.), the number average particle diameter is 3.2 μm.
Fixing Properties The magnetic polymer particles D are applied onto a slide glass, and the slide glass is covered with a cover glass. The slide glass is put in an over at 130° C. for 3 min. After that, when the magnetic polymer particles on the slide glass are observed by use of an optical microscope, it is found that particles fuse together, an interface disappears and the slide glass and the cover glass are strongly adhered. From the results, it is found that the magnetic polymer particles D have the fixability.

Example 5

Production of Magnetic Polymer Particles

To 200 parts of the magnetic powder 1, 400 parts of a non-crosslinked styrene acrylic resin (trade name: ESLEC P-SE-0020, manufactured by Sekisui Chemical Co., Ltd.) are added, followed by kneading by means of a Banbury mixer, to thereby obtain a resin in which magnetic powder is dispersed. 73 parts of the resin, 7 parts of hydroxyethyl methacrylate (manufactured by Wako Pure Chemical Industries, Ltd.), 15 parts of styrene monomer (manufactured by Wako Pure Chemical Industries, Ltd.), 20 parts of n-butyl methacrylate, 30 parts of cyclohexanone and 1 part of divinylbenzene (manufactured by Wako Pure Chemical Industries, Ltd.) are mixed, and a ball mill is used for dispersion for 24 hr. To 90 parts of the magnetic powder dispersion, 1 part of azobisisobutyronitrile (manufactured by Wako Pure Chemical Industries, Ltd.) are added as a polymerization initiator, to thereby prepared a mixture including a monomer, anon-crosslinked resin and the magnetic powder.

In a aqueous solution obtained by dissolving 28 parts of sodium chloride in 132 parts of ion-exchanged water, 48 parts of calcium phosphate (manufactured by Wako Pure Chemical Industries, Ltd.) and 2.0 parts of carboxyl methyl cellulose (trade name: CELLOGEN, manufactured by Dai-ichi Kogyo Seiyaku Co., Ltd.) are added as dispersion stabilizers, followed by dispersing for 24 hr by means of a ball mill to form a dispersion medium. The mixture is put in 200 pats of the dispersion medium, and the resultant produce is emulsified at 8,000 rpm for 3 min by an emulsifying apparatus (trade name: ULTRA TURRAX, manufactured by IKA Works Inc.), to thereby obtain a suspension. A number average particle diameter of the suspension particles is 2.0 μm.

On the other hand, in a separable flask provided with a stirrer, a thermometer, a cooling pipe, and a nitrogen introducing pipe, nitrogen is introduced from the nitrogen introducing pipe to establish a nitrogen atmosphere in the flask. The suspension is put in the flask, and a reaction is carried out at 65° C. for 3 hr, followed by further heating at 70° C. for 10 hr, and cooling. A reaction solution is an excellent dispersion and no aggregate is visually observed during the polymerization. To the reaction solution, an aqueous solution of 10% hydrochloric acid is added to decompose calcium phosphate, followed by applying solid-liquid separation by means of a centrifuge. The obtained particles are washed with 1,000 parts of ion-exchanged water, followed by repeating washing with 1,000 parts of ethanol, further following by repeating substitution and washing with 1,000 parts of ion-exchanged water, to thereby obtain magnetic polymer particles E.

After the magnetic polymer particles E are dried in an oven at 60° C., a yield amount of the magnetic polymer particles is measured and found to be 66 parts, that is, 80% by yield (rate).
Evaluation of Characteristics of Magnetic Polymer Particles
Amount of Magnetic Powder The magnetic polymer particles E are passed through a 1-μm nylon mesh according to Example 1 to fractionate into a particle group E1 having an average particle diameter of 1 μm and a particle group E2 having an average particle diameter of 3 μm. The amounts of the magnetic powders in the respective particle groups are calculated, and it is found that the amount of the magnetic powder in the particle group E1 is 15% and the amount of the magnetic powder in the particle group E2 is 16%, that is, the respective amounts are substantially the same.

Amount of Hydroxyl Groups and Amount of Crosslinked Polymer

In accordance with Example 1, an amount of hydroxyl groups of the magnetic polymer particles E and an amount of the crosslinked polymer thereof are measured. As a result, the amount of hydroxyl groups is 0.43 mmol/g and the amount of the crosslinked polymer in the magnetic polymer particles E2 of which magnetic powder content is 16% is 38% with respect to the crosslinked polymer and the non-crosslinked polymer.

Number Average Particle Diameter and Form of Particles

In accordance with Example 1, based on a photograph taken by electron microscope observation of dry particles, the number average particle diameter of the polymer particles is determined to be 2.0 μm. In the photograph, no agglomerated particles are found.

Existing State of Magnetic Powder on Particle Surface and Inside of Particle

In accordance with Example 1, an existing state of magnetic powder on a particle surface is confirmed and a magnetic powder projected from a particle surface is not observed. Furthermore, in the sectional observation with a TEM as well, a photograph following FIG. 2 is obtained, that is, the magnetic powder is localized in a center portion with an excellent dispersion state maintained inside of a particle.

Preparation and Characteristics of Aqueous Dispersion

In accordance with Example 1, an aqueous dispersion is prepared from dry magnetic polymer particles E. In the aqueous dispersion, all of the particles are excellently re-dispersed in water, without any floating on the water surface or precipitating at a vessel wall surface.

Furthermore, when particle diameters of the particles dispersed in the aqueous dispersion are measured by use of a laser diffraction particle size distribution analyzer (trade name: LA-700, manufactured by Horiba Ltd.), the number average particle diameter is 2.8 μm.

Fixing Properties

The magnetic polymer particles E are applied onto a slide glass, and the slide glass is covered with a cover glass. The slide glass is put in an oven at 130° C. for 3 min. After that, when the magnetic polymer particles on the slide glass are observed by use of an optical microscope, it is found that particles fuse together, an interface disappears and the slide glass and the cover glass are strongly adhered. From the results, it is found that the magnetic polymer particles E have the fixability.

Example 6

Production of Magnetic Polymer Particles 6 parts of hydroxyethyl methacrylate (manufactured by Wako Pure Chemical Industries Ltd.), 1 part of polyethylene glycol methacrylate (trade name; BLENMER PE200, manufactured by Nippon Oil & Fats Co., Ltd.), 15 parts of styrene monomer (manufactured by Wako Pure Chemical Industries Ltd.), 20 parts of n-butyl methacrylate, 26 parts of styrene acrylic resin (trade name: ESLEC P-SE-0020, manufactured by Sekisui Chemical Co., Ltd.), 30 parts of cyclohexanone and 1 part of divinylbenzene (manufactured by Wako Pure Chemical Industries Ltd.) are mixed. To the mixture solution, 2:33 parts of the magnetic powder (magnetic powder content: 60%) are added, followed by dispersing for 24 hr by use of a ball mill. To 90 parts of the magnetic powder dispersion, 1 part of azobisisobutyronitrile (manufactured by Wako Pure Chemical Industries Ltd.) are added as a polymerization initiator, to thereby prepare a mixture including a monomer, a non-crosslinked resin and the magnetic powder.

In an aqueous solution obtained by dissolving 28 parts of sodium chloride in 132 parts of ion-exchanged water, 48 parts of calcium carbonate (trade Name; LUMINUS, manufactured by Maruo Calcium Co., Ltd.) and 2.0 parts of carboxy methyl cellulose (trade name: CELLOGEN, manufactured by Dai-ichi Kogyo Seiyaku Co., Ltd.) are added as dispersion stabilizers, followed by dispersing for 24 hr by means of a ball mill to form a dispersion medium. The mixture is put in 200 parts of the dispersion medium, and the resultant product is emulsified at 8,000 rpm for 3 min by use of an emulsifying apparatus (trade name: ULTRA TURRAX, manufactured by IKA Works Inc.), to thereby obtain a suspension. A number average particle diameter of the suspension particles is 2.0 μm.

On the other hand, in a separable flask provided with a stirrer, a thermometer, a cooling pipe, and a nitrogen introducing pipe, nitrogen is introduced from the nitrogen introducing pipe to establish a nitrogen atmosphere in the flask. The suspension is put in the flask, and a reaction is carried out at 65° C. for 3 hr, followed by further heating at 70° C. for 10 hr, and cooling. A reaction solution is an excellent dispersion and no aggregate is visually observed during the polymerization. To the reaction, an aqueous solution of 10% hydrochloric acid is added to decompose calcium carbonate, followed by applying solid-liquid separation by means of a centrifuge. The obtained particles are washed with 1,000 parts of ion-exchanged water, followed by repeating washing with 1,000 parts of ethanol, further followed by repeating substituting and washing once more with 1,000 parts of ion-exchanged water, to thereby obtain magnetic polymer particles F.

After the magnetic polymer particles F are dried in an oven at 60° C., a yield amount of the magnetic polymer particles is measured and found to be 56 parts, that is, 81% by yield (rate).

Evaluation of Characteristics of Magnetic Polymer Particles

Amount of Magnetic Powder

The magnetic polymer particles F are passed through a 1-μm nylon mesh according to Example 1 to fractionate into a particle group F1 having an average particle diameter of 1 μm and particle group F2 having an average particle diameter of 3 μm. The amount of the magnetic powders in the respective particle groups are calculated, and it is found that the amount of the magnetic powder in the particle group F1 is 18% and the amount of the magnetic powder in the particle group F2 is 20%, that is, the respective amounts are substantially the same.

Amount of Hydroxyl Groups and Amount of Crosslinked Polymer

In accordance with Example 1, an amount of hydroxyl groups of the magnetic polymer particles F and a content of the crosslinked polymer thereof are measured. As a result, the amount of hydroxyl groups is 0.6 mmol/g, and the amount of the crosslinked polymer in the magnetic polymer particles F2 of which magnetic powder content is 20% is 52% with respect to the crosslinked polymer and the non-crosslinked polymer.

Number Average Particle Diameter and Form of Particles

In accordance with Example 1, based on a photograph taken by electron microscope observation of dry particles, the number average particle diameter of the polymer particles is determined to be 2.5 μm. In the photograph, no agglomerated particles are found.

Existing State of Magnetic Powder on Particle Surface and Inside of Particle

In accordance with Example 1, an existing state of magnetic powdered on a particle surface is confirmed and magnetic powder projected from a particle surface is not observed. Furthermore, in the sectional observation with a TEM as well, a photograph following FIG. 2 is obtained. That is, the magnetic powder is localized in a center portion with an excellent dispersion state maintained inside of a particle.

Preparation and Characteristics of Aqueous Dispersion

In accordance with Example 1, an aqueous dispersion is prepared from dry magnetic polymer pastilles F. In the aqueous dispersion, all of the particles are excellently re-dispersed in water, without any floating on the water surface or precipitating on a vessel wall surface.

Furthermore, when particle diameters of the particles dispersed in the aqueous dispersion are measured by use of a laser diffraction particle size distribution analyzer (trade name: LA-700, manufactured by Horiba Ltd.), the number average particle diameter is 2.8 μm.

Fixing Properties

The magnetic polymer particles F are applied onto a slide glass, and the slide glass is covered with a cover glass. The slide glass is put in an oven at 130° C. for 3 min. After that, when the magnetic polymer particles on the slide glass are observed by use of an optical microscope, the particles do not fuse completely together, an particle interface remains, and the slide glass and the cover glass are weakly adhered and readily peeled. From the results, it is found that the magnetic polymer particles F have insufficient fixability.

Comparative Example 1

Suspension polymerization is carried out in accordance with Example 2 except that, in the production of the magnetic polymer particles of Example 2, 28 parts of 55 parts of the styrene acrylic resin (trade name: ESLEC P-SE-0020, manufactured by Sekisui Chemical Co., Ltd.) area substituted by 8 parts of a styrene monomer (manufactured by Wako Pure Chemical Industries, Ltd.) and 20 parts of n-butyl methacrylate, to thereby obtain magnetic polymer particles G.

The magnetic polymer particles G are dried in an oven at 60° C. The yield amount of the magnetic polymer particles is measured and found to be 61 parts, that is, 83% by the yield (rate), which is excellent. Furthermore, when, in accordance with Example 1, the number average particle diameter of the polymer particles obtained by electron microscope observation of the dry particles is 2.2 μm, and no agglomerated particle is found.

Next, in accordance with Example 1, the magnetic polymer particles Ga re applied onto a slide glass, and the slide glass is covered with a cover glass. The slide glass is put in an oven at 130° C. for 3 min. After that, when the magnetic polymer particles G on the slide glass are observed by use of an optical microscope, it is found that particles do not at all fuse together, a particle interface slow no change, and the slide glass and the cover glass are not adhered to each other. From the result, it is found that the magnetic polymer particles do no have the fixability under the heating conditions.

When the amount of hydroxyl groups in the magnetic polymer particles G is measured in accordance with Example 1, the amount of hydroxyl groups in the particles is 0.45 mmol/g. In this case, the amount of the crosslinked polymer is 64% with respect to the crosslinked polymer and the non-crosslinked polymer.

Comparative Example 2

Suspension polymerization is carried out in accordance with Example 2 except that, in the production of the magnetic polymer particles of Example 2, 6 parts of hydroxyethyl methacrylate (manufactured by Wako Pure Chemical Industries, Ltd.) is substituted by 3 parts of styrene monomer (manufactured by Wako Pure Chemical Industries, Ltd.), and 1 part of polyethylene glycol methacrylate (trade name: BLENMER PE200, manufactured by Nippon Oil & Fats Co., Ltd.) is substituted by 4 parts of n-butyl methacrylate, to thereby obtain magnetic polymer particles H.

The magnetic polymer particles H are dried in an oven at 60° C. The yield amount of the magnetic polymer particles is measured and found to be 66 parts, that is, 80% by the yield (rate).

In accordance with Example 1, the number average particle diameter of the polymer particles is measured from a photograph of the dry particles by electron microscope observation, and it is found to be 2.5 μm. Further, agglomerated particles are found scattered. Furthermore, in accordance with Example 1, the magnetic polymer particles H are fractionated into a particle group H1 having an average particle diameter of 1 μm and a particle grouped H2 having an average particle diameter 3 μm, and amounts of the magnetic powder in the particles of both particle groups are calculated. As a result, it is found the amount of the magnetic powder in the particle group H1 is 15% and the amount of the magnetic powder in the particle group H2 is 16%, that is, the respective amounts are substantially the same.

When an amount of hydroxyl groups of the magnetic polymer particles H is measured in accordance with Example 1, the amount of hydroxyl groups of the particle is 0.01 mmol/g.

Next, when an existing sate of the magnetic powder on a particle surface is observed by means of SEM in accordance with Example 1, it is found that the magnetic powder protrudes from a part of the particle surface. Furthermore, preparation of an aqueous dispersions is attempted by using the polymer particles H in accordance with Example 1. However, un-dissolved lumps (agglomerated particles) are formed on a water surface, and the magnetic particles are merely excellently re-dispersed in water. Thus, the obtained magnetic polymer particles H are incompatible with water.

Comparative Example 3

Suspension polymerization is carried out in accordance with Example 1 except that, in the production of the magnetic polymer particles of Example 1, the amount of the styrene acrylic resin (trade name: ESLEC P-SE-0020, manufactured by Sekisui Chemical Co., Ltd.) is changed from 40 parts to 30 parts, 7 parts of hydroxyethyl methacrylate (manufactured by Wako Pure Chemical Industries, Ltd.) and 12 parts of styrene monomer are changed to 22 parts of a styrene monomer (manufactured by Wako Pure Chemical Industries Ltd.), the amount of n-butyl methacrylate is changed from 16 parts to 20 parts, and the amount of divinylbenzene (manufactured by Wako Pure Chemical Industries Ltd.) is changed from 1 part of 4 parts, to thereby obtain magnetic polymer particles I.

The magnetic polymer particles I are dried in an oven at 60° C. The yield amount of the magnetic polymer particles is measured and found to be 55 parts, that is, 80% by the yield (rate).

Next, in accordance with Example 1, the magnetic polymer particles I are applied onto a slide glass, and the slide glass is covered with a cover glass. The slide glass is put in an oven at 130° C. for 3 min. After that, when the magnetic polymer particles I on the slide glass are observed by use of an optical microscope, it is found that particles do not at all fuse together, a particle interface shows no change, and the slide glass and the cover glass are not adhered to each other. From the result, it is found that the magnetic polymer particles do not have the fixability under the heating conditions.

When the amount of hydroxyl groups in the magnetic polymer particles I is measured in accordance with Example 1, the amount of hydroxyl groups in the particles is 0.01% mmol/g. In this case, the amount of the crosslinked polymer is 60% with respect to the crosslinked polymer and the non-crosslinked polymer.

Comparative Example 4

A mixture including a monomer, a non-crosslinked resin and a magnetic powder is suspended and polymerized in accordance with Examples 1 except that, in the production of the magnetic polymer of Example 1, sodium chloride is not added in the preparation of the dispersion medium, in the washing step with ion-exchanged water, while fine particles passing through a filter paper (trade name: No. 5C, manufactured by ADVANTEC Co. Ltd., retention particle diameter: 1 μm) are observed. Accordingly, it is confirmed that an emulsifying polymerization occurs in the dispersion medium. The yield amount of the obtained magnetic polymer particles J is measured and found to be 38 parts, that is, 54% by the yield (rate).

When the amount of hydroxyl groups in the magnetic polymer particles J is measured in accordance with Example 1, the amount of hydroxyl groups in the particles is as low as 0.03 mmol/g. Furthermore, when the polymer particles are observed with an electron microscope, it is found that, although the fluctuation of the particle size is large, the number average particle diameter is 2.0 μm. A considerable number of agglomerated particles are found.

Furthermore, preparation of an aqueous dispersion is attempted by using the polymer particulates J in accordance with Example 1. However, un-dissolved lumps (agglomerated particles) are formed on a water surface, and the magnetic particles are merely excellently re-dispersed in water. Thus, the obtained magnetic polymer particles J are incompatible with water.

Comparative Example 5

A mixture of a monomer, a non-crosslinked resin and a magnetic powder is tried to suspended and polymerized in accordance with Example 1 except that, in the production of the magnetic polymer particles of Example 1, calcium carbonate is not added in the preparation of the dispersion medium. However, the mixture is not excellently suspended in the dispersion medium and forms agglomerates upon polymerization, resulting in failure in obtaining desired polymer particles.

Comparative Example 6

Suspension polymerization is carried out in accordance with Example 1 except that, in the production of the magnetic polymer particles of Example 1, divinylbenzene (manufactured by Wako Pure Chemical Industries Ltd.) is not added in the preparation of the mixture. However, the particles agglomerate during the polymerization, resulting in failure in obtaining desired polymer particles.

As mentioned above, in the Examples of the invention, suspension particles are stable at the polymerization and thus doe not agglomerate. Accordingly, magnetic polymer particles which are excellent in the dispersibility in water and exhibit excellent fixability by heating may be obtained. In contrast, in Comparative Examples where producing conditions are changed, there arise problems in the yield, particle state, particle characteristics, or the like.

What is claimed is:

1. A magnetic polymer particle, comprising:
    a magnetic powder;
    a crosslinked polymer formed by polymerization of an ethylenically unsaturated monomer; and
    a non-crosslinked polymer,
    the amount of the magnetic powder with respect to the total amount of the magnetic polymer particle being in a range of about 2.5% by mass to about 50% by mass, the ethylenically unsaturated monomer including a monomer having a hydroxyl group and a hydrophobic monomer which is free from a hydroxyl group, and the amount of hydroxyl groups included in the crosslinked polymer and the non-crosslinked polymer being in a range of about 0.1 mmol/g to about 5.0 mmol/g with respect to the total amount of the crosslinked polymer and the non-crosslinked polymer,
    the amount of the crosslinked polymer is in a range of about 0.5% by mass to about 49.5% by mass with respect to the total amount of the crosslinked polymer and the non-crosslinked polymer wherein the ethylenically unsaturated monomer further includes a monomer having a carboxyl group, the hydrophobic monomer which is free from hydroxyl group is further free from a carboxyl group.

2. The magnetic polymer particle of claim 1, wherein the amount of carboxyl groups included in the crosslinked polymer and the non-crosslinked polymer is in a range of about 0.005 mmol/g to about 0.5 mmol/g.

3. The magnetic polymer particle of claim 2, wherein at least portions of the carboxyl groups form a salt structure.

4. The magnetic polymer particle of claim 1, wherein the magnetic powder is localized inside of the magnetic polymer particle.

5. An aqueous dispersion, comprising the magnetic polymer particle of claim 1.

6. The aqueous dispersion of claim 5, wherein the amount of the magnetic polymer particle is about 5.0% by mass to about 30% by mass with respect to the amount of an aqueous solvent of the aqueous dispersion.

7. A cartridge, comprising:
    a liquid storage container for storing a liquid;
    a liquid retaining unit for retaining the liquid; and
    a liquid supply unit for supplying the liquid to the liquid retaining unit,
    wherein the liquid storage container stores the aqueous dispersion of claim 5.

* * * * *